United States Patent [19]

Norton et al.

[11] Patent Number: 5,704,836
[45] Date of Patent: Jan. 6, 1998

[54] MOTION-BASED COMMAND GENERATION TECHNOLOGY

[75] Inventors: John Mark Norton, Santa Clarita; Bela Laszlo Brozsek, Topanga, both of Calif.

[73] Assignee: Perception Systems, Inc., Santa Clarita, Calif.

[21] Appl. No.: 604,186

[22] Filed: Feb. 21, 1996

Related U.S. Application Data

[63] Continuation-in-part of Ser. No. 554,473, Nov. 7, 1995.

[30] Foreign Application Priority Data

Mar. 23, 1995 [GB] United Kingdom ............... 9505916

[51] Int. Cl.$^6$ ............................... A63F 9/22; G01V 9/04
[52] U.S. Cl. ................... 463/36; 250/221; 345/156
[58] Field of Search ..................... 463/36, 29, 47; 395/156, 158; 250/202, 221

[56] References Cited

U.S. PATENT DOCUMENTS

| Re. 33,662 | 8/1991 | Blair et al. | 463/3 |
|---|---|---|---|
| 4,711,543 | 12/1987 | Blair et al. | 352/87 |
| 4,768,088 | 8/1988 | Ando | 348/77 |
| 4,925,189 | 5/1990 | Braeunig | 273/148 B |
| 5,227,985 | 7/1993 | DeMenthon | 364/559 |
| 5,239,463 | 8/1993 | Blair et al. | 364/410 |
| 5,241,608 | 8/1993 | Fogel | 364/174 |
| 5,320,538 | 6/1994 | Baum | 434/307 R |
| 5,347,306 | 9/1994 | Nitta | 348/15 |
| 5,423,554 | 6/1995 | Davis | 463/4 |
| 5,442,168 | 8/1995 | Gurner et al. | 364/410 |

FOREIGN PATENT DOCUMENTS 04 77 910A2  9/1991  European Pat. Off. .

OTHER PUBLICATIONS

IBM Corporation Technical Disclosure Bulletin (re Virtual Mouse) vol. 34 No. 12, May 1992.
Article: PC-SteuerungIMHANDDUMDR Funkschau 66 (1994), 21 Jan., No. 3, pp. 82–85.

Primary Examiner—Jessica Harrison
Assistant Examiner—James Shaaf
Attorney, Agent, or Firm—Oppenheimer Poms Smith

[57] ABSTRACT

A command system optically monitors the movement of a subject and provides command signals to a computer system to control a graphic of a graphical user interface displayed on a monitor such as an animated character in a video game. The command system has an optical detector unit which continuously scans a subject frame in which the subject is positioned. The subject frame is divided into sub-regions around the subject in which movement of the subject is detected, for example, an arm moving. A command unit receives and processes frame data from the optical detector unit. The command unit determines the velocity of any movement detected in any of the sub-regions and generates an appropriate command signal based on the velocity of the movement. The command unit may also use the direction of the movement in generating command signals. The command signals are then provided to the computer system to move and control the graphical user interface accordingly.

28 Claims, 16 Drawing Sheets

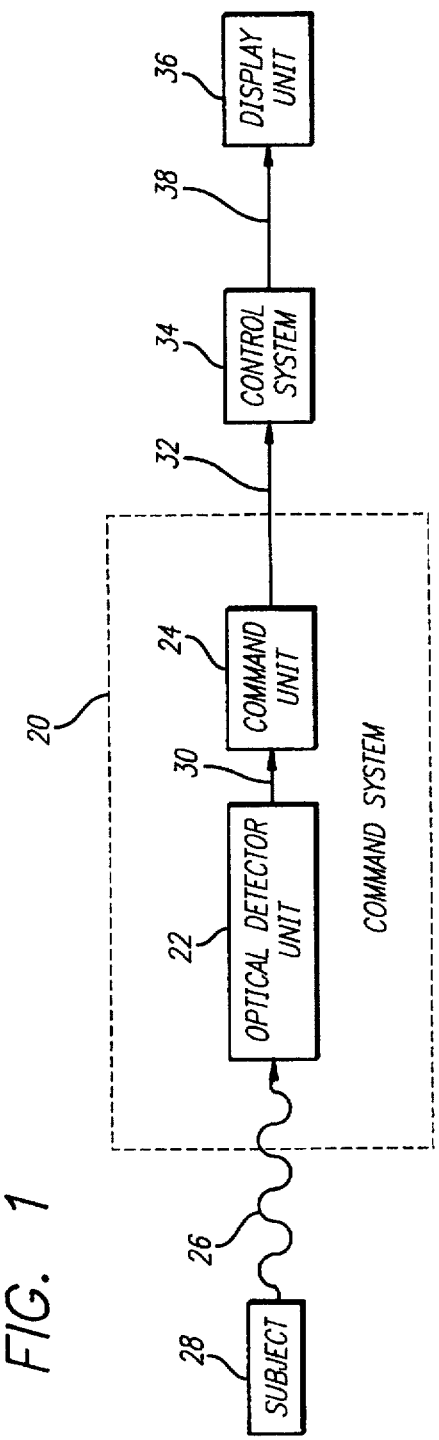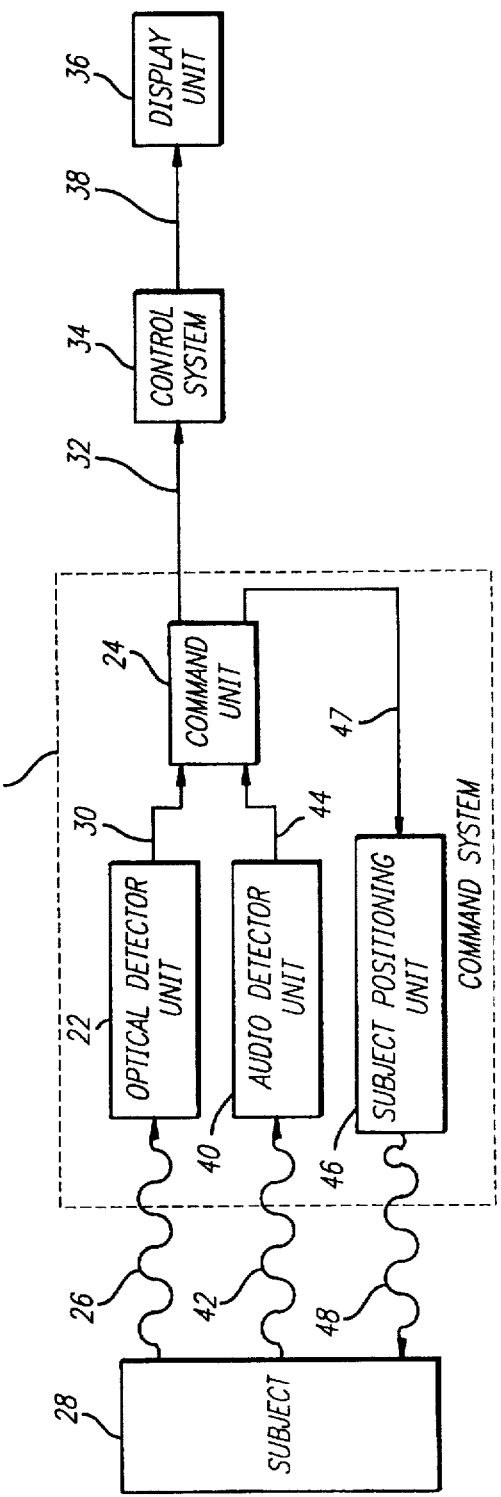

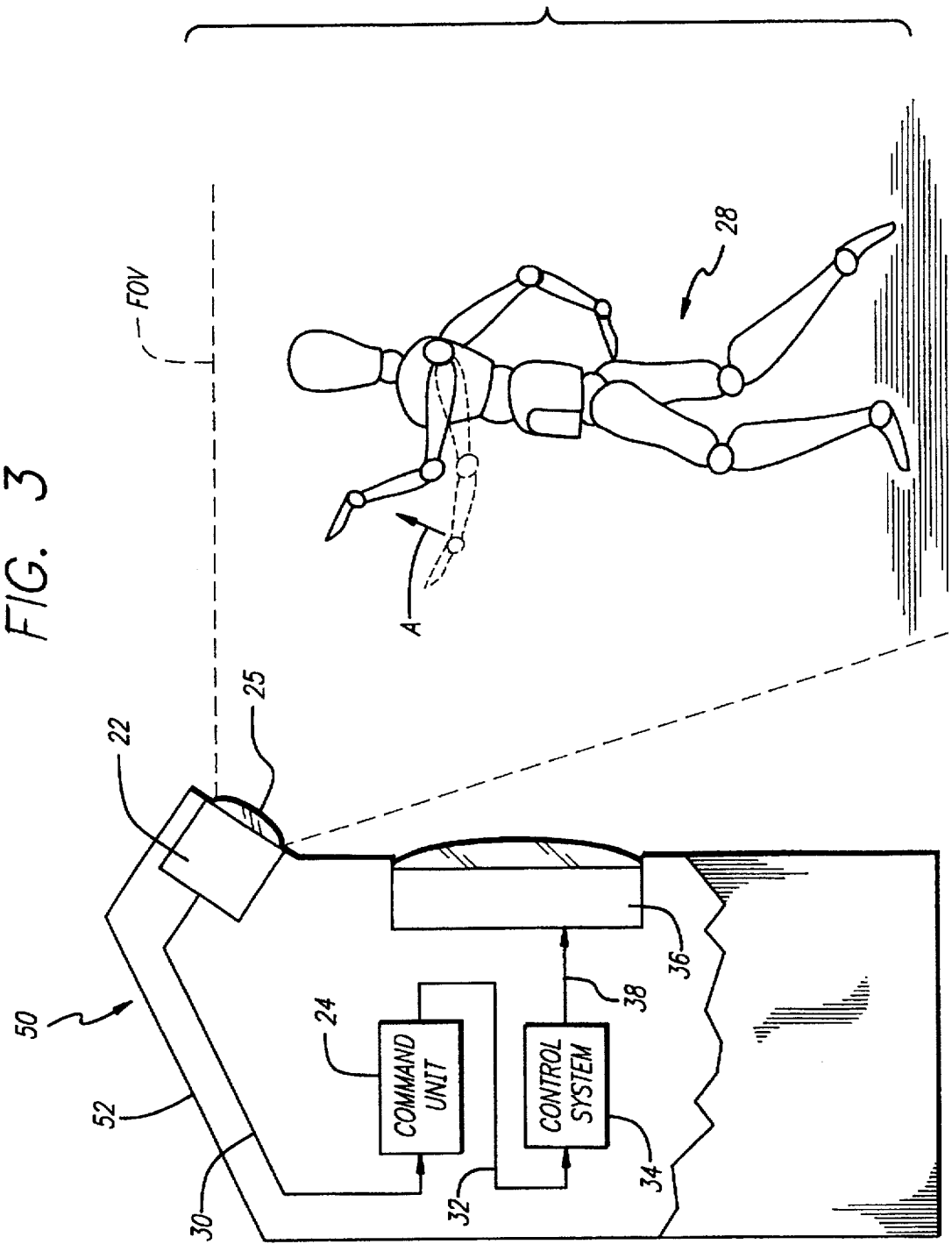

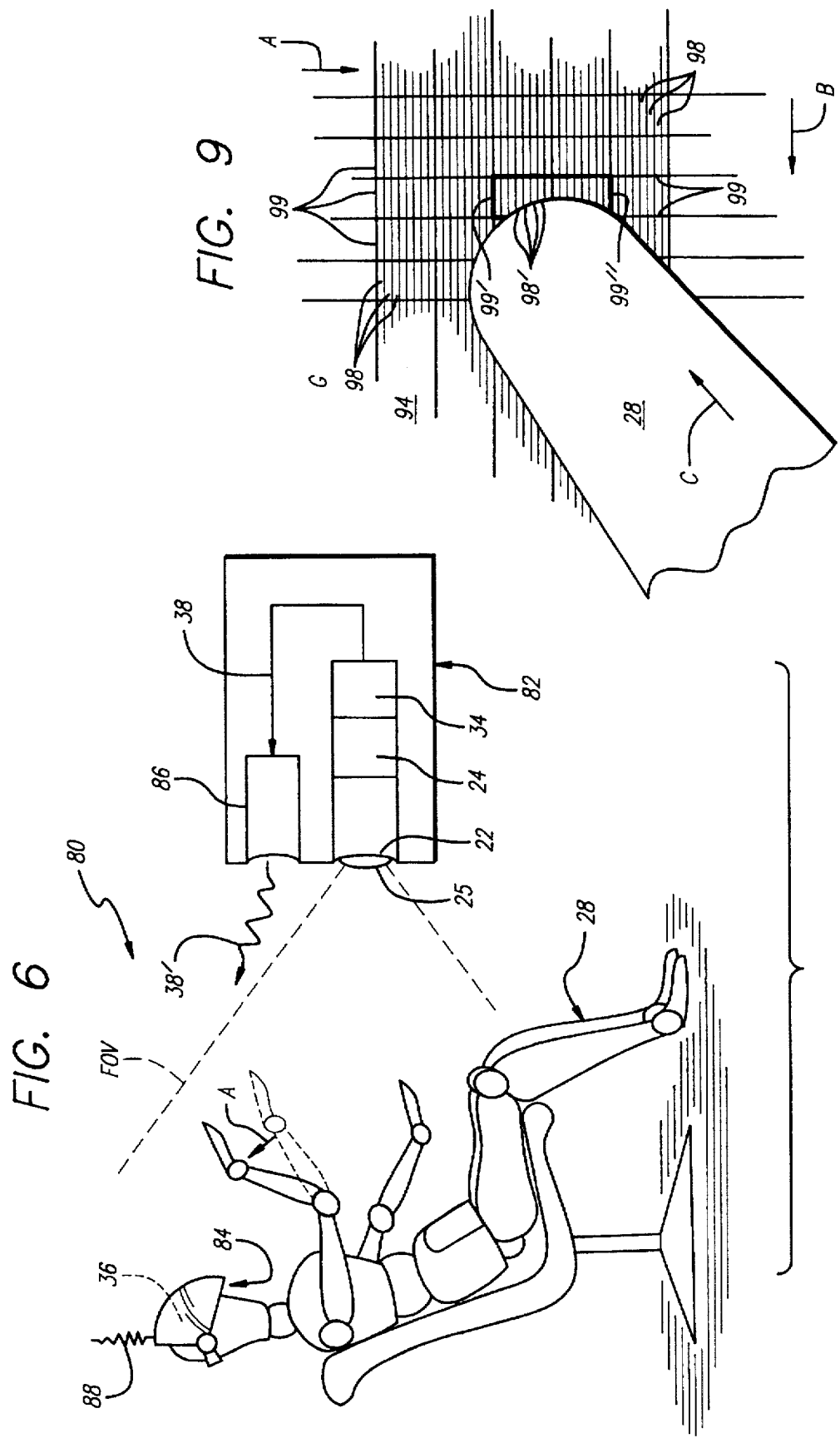

5,704,836

MOTION-BASED COMMAND GENERATION TECHNOLOGY

CROSS-REFERENCE TO PRIOR APPLICATIONS

The present invention is a continuation-in-part application of U.S. patent application Ser. No. 08/554,473 filed on Nov. 7, 1995, which patent application claims priority on British Application No. 9505916.8 filed on Mar. 23, 1995.

BACKGROUND OF THE INVENTION

1. Field of the Invention

The present invention relates to methods and apparatus for controlling a graphical user interface displayed on a monitor, and, more particularly, to a command system and a method for controlling a graphical user interface based upon the movement of a user or subject.

2. Description of Related Art

Several different input devices for controlling a computer are known. Traditional devices have included a keyboard, a "mouse", etc. For computer games, joysticks and game pads are other well known input devices. Many variants of the basic joystick and game pad are known. All of these devices require mechanical movement of some aspect of the device in order to output control signals to the computer.

The mechanical prior art devices have a number of drawbacks. The amount of control possible with a conventional device is often fairly limited. For example, a joystick can usually only provide directional control in eight distinct directions; controlling the speed of movement of a character in a game often requires the use of a combination of buttons as well as use of the joystick for directional control, which means that the user has to spend a considerable period of time just learning to use the controls for a new game. It is often easy for dirt to enter the device as well as impair the integrity of the electrical connections. The required movement for some of the prior art controllers can be counter-intuitive, particularly for games applications. Furthermore, and probably most significantly, repeated and prolonged use of a mouse, joystick, or game pad, for example, can cause pain to the user, particularly in the hand or arm, and may cause long term or permanent damage to the user.

SUMMARY OF THE INVENTION

It is an object of the present invention to provide a command system for controlling a graphical user interface which mitigates and/or obviates the aforementioned drawbacks of conventional control devices.

It is another object of the present invention to provide a command system which allows a user to control a graphic of a graphical user interface more naturally and realistically than convention control devices.

It is yet another object of the invention to provide a command system which allows a user to control a graphic of a graphical user interface in a completely hands-free manner.

It is still another object of the invention to provide a command system which controls a graphic of a graphical user interface in a highly efficient and expedient manner.

It is a further object of the present invention to provide a command system which controls a graphic of a graphical user interface based on the movement of the user, specifically the velocity of the movement of a user.

It is still a further object of the invention to provide a command system which controls a graphic of graphical user interface in a manner proportional to the magnitude of the velocity of the movement of a user.

These objects as well as other objects, features, and benefits of the present invention are achieved by providing a command system which monitors the movement of a subject and controls, in accordance with the movement of the subject, a graphical user interface, particularly a graphic such as a cursor or game character thereof. The command system includes an optical detector unit and a command unit. The optical detector unit has an aperture through which light from a field of view is receivable, with the subject being positioned in the field of view. The optical detector unit also has an output which provides frame data indicative of the light received from the field of view, with the frame data defining a subject frame. The output provides the frame data on a subject frame-by-subject frame basis.

The command unit has an input in communication with the output of the optical detector unit which receives the frame data on the subject frame-by-subject frame basis. The command unit also has an output which provides a command signal to control the graphic user interface. The command unit includes processing circuitry in communication with the input and the output of the command unit. The processing circuitry determines the position of the subject in a previous subject frame from the frame data of the previous subject frame, and the position of the subject in a present subject frame from the frame data of the present subject frame. The processing circuitry then calculates the velocity of the subject based upon the positions of the subject in the previous and the present subject frame. The processing circuitry then generates a command signal based upon the velocity of the subject.

One of the advantages of the present invention is that a user may operate a video game or a computer without using a conventional input device such as a joystick, a mouse, a keypad, and so on. Rather, the user (i.e., the subject) moves around in the field of view of the optical detector unit, for example, moves an arm, a leg, or a hand, and controls a character or vehicle in a video game or a cursor on a computer. Accordingly, the user may control the movement of the graphical user interface by the natural movement of the user's body.

According to one aspect of the present invention, the processing circuitry of the command unit may calculate the magnitude of the velocity of the subject, and then generate a command signal proportional to the magnitude of the velocity. By generating the command signal as a function of velocity, the user may advantageously control the level of the intended command signal. For example, if the movement of the user's arm is programmed to generate a "punching" command in a martial-arts video game, then a moderate arm movement would result in a "moderate" punch, while a fast arm movement would result in a "hard" punch.

According to another aspect of the command system of the present invention, the processing circuitry of the command unit may also calculate direction of the subject based upon the position of the subject in the previous subject frame and upon the position of the subject in the present subject frame. The processing circuitry then generates a command signal based upon the velocity and the direction of the subject. By basing the command signal on direction as well as on velocity, the user may control the graphical user interface with more accuracy and with a wider range of commands.

One of the advantages of calculating direction is that the command generation process is more efficient and fast. This may be accomplished by calculating the horizontal direction and the vertical direction of the subject based upon the position of the subject in the previous subject frame and upon the position of the subject in the present subject frame. The velocity of the subject in the horizontal and vertical directions may then be calculated and then compared to each other to determine which of the two velocities is greater. The processing circuitry then generates a command signal based upon the greater of the two velocities. Thus, rather than calculating velocity with elaborate methods, the velocity of the subject is easily approximated with the greater of the two direction velocities.

Another aspect of the present invention is that the command system may further include a subject positioning unit. In order to operate a video game, for example, in the most efficient manner, it may be preferable for the subject to be properly positioned within the field of view of the optical detector unit. Accordingly, the processing circuitry of the command unit may determine whether the subject is positioned in a proper position within the field of view, and then generates a positioning signal based upon the position of the subject in the field of view when the subject is not in the proper position within the field of view. The subject positioning unit, having a input in communication with the output of the command unit, then receives the positioning signal. A subject interface signalling to the subject that the subject is not in the proper position based upon the positioning signal.

One aspect of this embodiment of the present invention is that the processing circuitry of the command unit may determine which direction the subject needs to move to be in the proper position in the field of view. The processing circuitry then generates a positioning signal based upon the direction the subject needs to move to be in the proper position. The subject interface of the subject positioning unit then signals to the subject which direction the subject needs to move to be in the proper position. The subject interface of the subject positioning unit may include an array of light-emitting diodes (LEDs) configured such that when the LEDs illuminate based upon the positioning signal, the LEDs indicate to the subject which direction the subject needs to move to be in the proper position. For example, the array of LEDs may include an up LED, a down LED, a left LED, and a right LED, with the subject interface illuminating the LED corresponding to the direction in which the subject needs to move to be in the proper position as indicated by the positioning signal.

According to one aspect of a preferred embodiment of the present invention, the optical detector unit includes a charge-coupled device (CCD) having a plurality of pixels. The light received through the aperture from the field of view is incident on the pixels. Each of the pixels has a value indicative of the amount of light incident thereon, with the value of the pixels changing from one subject frame to the next subject frame when the amount of light incident thereon changes, with the frame data for a subject frame being comprised of the values of the pixels for the subject frame.

According to this embodiment, the processing circuity of the command unit compares the value of each of the pixels of the present subject frame with the value of the corresponding pixel of the previous subject frame to obtain a difference value for each of the pixels. An ON difference bit is then assigned to each of the pixels for which the difference value is greater than a predetermined threshold value. The processing circuitry then determines an edge of the subject in the subject frame by locating at least two adjacent pixels to which an ON difference bit was assigned, with the position of the adjacent pixels being recorded. Velocity of the subject is then calculated by using the position of the adjacent pixels in the previous subject frame and the position of the adjacent pixels in the present subject frame, with the command signal being generated based upon the velocity of the subject.

Velocity may be calculated in a variety of ways but is preferably calculated simply by dividing distance by time. The CCD of the optical detector unit transmits the frame data on the subject frame-by-subject frame basis at a predetermined frequency, such that there is a predetermined period of time between the previous subject frame and the present subject frame. The processing circuitry calculates the distance between the position of the adjacent pixels in the previous subject frame and the position of the adjacent pixels in the present subject frame, and then divides the distance by the predetermined period of time between the previous subject frame and the present subject frame, thus obtaining the velocity of the subject between the two subject frames.

The processing circuitry may define a command vector extending from the position of the adjacent pixels in the previous subject frame to the position of the adjacent pixels in the present subject frame, and then calculate the magnitude of the command vector to obtain the velocity of the subject. The command signal would then be based upon the magnitude of the command vector.

The processing circuitry may also determine a horizontal direction vector and a vertical direction vector of the command vector, and calculate the magnitudes of the horizontal and vertical direction vectors. The respective magnitudes of the direction vectors are then compared to determine which of the two direction vectors has the greater magnitude. The processing circuitry then generates a command signal based upon the direction vector which has the greater magnitude.

One of the features of the present invention is that incidental movement of the subject or changes in the ambient lighting within the field of view do not adversely effect the operation of the command system. When the processing circuitry calculates velocity, it determines whether the velocity within a predetermined range, that is, between a minimum and a maximum velocity threshold. If the calculated velocity is not, then it is ignored. Therefore, small movements of the subject or movement other than the subject do not result in the generation of unwanted command signals.

Another feature of the present invention is that the command system compensates for user fatigue. The processing circuitry maintains a weighted average of the velocities of the subject in the subject frames previous to the present subject frame. If it is determined that the velocity calculated from the movement of the subject does not fall within a predetermined range, meaning that the subject is tired and not moving as quickly as at the beginning of the process, then the processing circuitry adjusts the velocity of the subject in the present frame based upon the weighted average.

Another advantage of the present invention is that the amount of data needed to be processed by the processing circuitry is greatly reduced. This is accomplished by providing the processing circuitry of the command unit with comparison circuitry which compares the value of each of the pixels of the present subject frame with the value of the corresponding pixel of the previous subject frame to obtain a difference value for each of the pixels. A difference bit is then assigned to each of the pixels, the difference bit being ON when the difference value is greater than a predetermined threshold value or OFF when the difference value is less than the predetermined threshold value. The difference bits of eight adjacent pixels are then combined into bytes the difference bits.

The processing circuitry may now process the bytes of difference bits quickly. This processing begins by determining whether the number of difference bits being ON in each of the bytes exceeds a predetermined number, with a flag being assigned to each of the bytes for which the number of difference bits being ON exceeds the predetermined number. An edge of the subject in the subject frame is then determined by locating at least two adjacent bytes to which a flag was assigned, which most likely indicates that the subject is moving and now located at those adjacent bytes. The position of the adjacent bytes is recorded. The processing circuitry then calculates the velocity of the subject based upon the position of the adjacent bytes in the previous subject frame and upon the position of the adjacent bytes in the present subject frame, and generates a command signal based upon the velocity of the subject.

This difference-bit combining feature of the present invention greatly reduces the amount of data required for processing by the command unit. First of all, eight difference bits are combined into a single byte for processing. Secondly, only those bytes which are located at the edge of the subject, i.e., only two bytes, are used in calculating velocity for each subject frame. Therefore, large amounts of data do not need to be processed, and only the position of the adjacent flagged bytes need to be stored for the next frame scan.

Further, with such simplified yet sophisticated processing techniques, the comparison circuitry of the command unit and the CCD of the optical detector unit may be advantageously fabricated on a single chip which can easily be implemented in a variety of applications. For example, the command system of the present invention may be used in arcade video games, video game home systems, computer workstations, virtual reality applications, surveillance systems, manufacturing and safety applications, and so on.

According to another aspect of the present invention, the sensitivity of the CCD of the optical detector unit is adjustable. In order to do this, the processing circuitry first compares the value of each of the pixels of the present subject frame with the value of the corresponding pixel of the previous subject frame to obtain a difference value for each of the pixels. A difference bit is assigned to each of the pixels for which the difference value is greater than a predetermined threshold value. The processing circuitry then counts the number of pixels to which a difference bit was assigned, and adjusts the sensitivity of the CCD when the number of pixels to which a difference bit was assigned exceeds a predetermined number.

The adjustment of CCD sensitivity has the advantage in that if the background lighting in the field of view suddenly changes for some reason, for example, a light turning on or off or a door opening or closing, then this change in lighting is compensated for by the processing circuitry. Therefore, the operation of the command system will not be adversely effected.

According to another aspect of the present invention, the processing circuitry of the command unit defines a plurality of sub-regions within the subject frame. The sub-regions surround an area within which the subject is positioned and the velocity of the subject is not calculated. The position of the subject in each of the sub-regions is then determined from the frame data of each of the subject frames. The processing circuitry then calculates the velocity of the subject in each of the sub-regions based upon the position of the subject in each of the sub-regions of the previous subject frame, and upon the position of the subject in the sub-regions of the present subject frame corresponding to each of the sub-regions of the previous subject frame. The command signal is then generated based upon the velocity of the subject in each of the sub-regions, with the number of command signals generated being up to the number of sub-regions defined within the subject frame.

By breaking the subject frame up into sub-regions, the command system of the present invention advantageously allows the user to generate a number of command signals to control a graphical user interface in a number of ways. For example, if the graphical user interface happens to be a martial arts master in a video game, then movement in one of the sub-regions may control punching, in another one of the sub-regions may control kicking, in yet another sub-region may control jumping, and so on. Accordingly, the subject may be moving both arms as well as a leg while playing such a video game, which increases the enjoyment and life-like qualities in playing the video game.

Still another aspect of the command system of the present invention is the provision of an audio detector unit having a microphone for receiving sound from the field of view, and an output for providing audio data indicative of the sound received from the field of view. The command unit is in communication with the audio detector unit and receives the audio data, interprets the audio data, and generates a command signal based upon the interpretation of the audio data. Therefore, in addition to monitoring the movement of the user to control a graphical user interface, the command system may also monitor voice commands from the user in generating command signals.

Other aspects, features, and advantages of the present invention will become apparent to those skilled in the art from a reading of the following detailed description with reference to the accompanying drawings.

BRIEF DESCRIPTION OF THE DRAWINGS

FIG. 1 is a block diagram of a video system with an optical-based command system configured according to principles of the present invention;

FIG. 2 is a block diagram of a video system with another optical-based command system configured according to principles of the present invention;

FIG. 3. is a diagrammatic view of an exemplary embodiment of an arcade-type video game system with an optical-based command system implemented in accordance with the present invention;

FIG. 6. is a diagrammatic view of an exemplary embodiment of a virtual reality system with an optical-based command system implemented in accordance with the present invention;

FIG. 9 is a view of a sub-region of a subject frame illustrating the detection of edge pixels for a subject in accordance with optical-based command principles of the present invention;

DETAILED DESCRIPTION OF THE PREFERRED EMBODIMENTS

Figure 5:
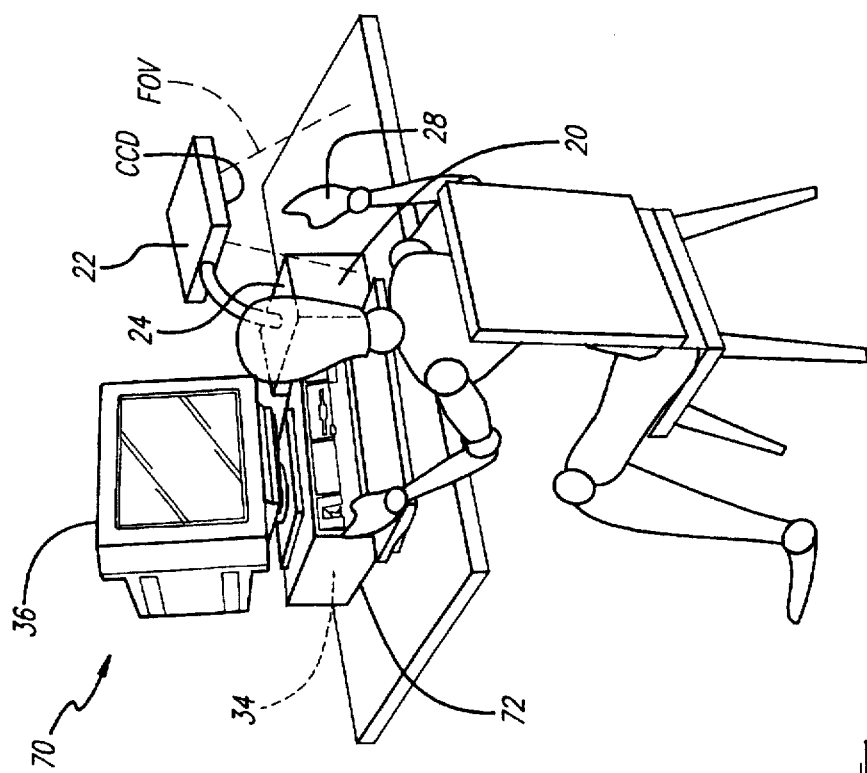
FIG. 5. is a diagrammatic view of an exemplary embodiment of a home computer system with an optical-based command system implemented in accordance with the present invention.

Motion-based command generation principles of the present invention are exemplified by the embodiments illustrated in the drawings. These principles focus on a velocity-based approach to generating command signals in a computerized environment. Exemplary embodiments of these command principles may take different forms, many of which are illustrated in the accompanying drawings. However, the disclosure herein will detail only specific preferred embodiments of this novel approach to command generation and will not provide an exhaustive description of all embodiments within the scope of the command-generating principles set forth herein and in the appended claims.

The Command System

Optical Command System

Referring to the drawings, particularly to FIG. 1, a block diagram of a command system 20 which exemplifies motion-based control principles of the present invention is shown. The command system 20 has optical detector unit 22 and a command unit 24 in communication with each other. The optical detector unit 22 has an aperture 25 (not shown in FIG. 1) through which optical signals 26 are received from a subject 28 and an output which provides frame data 30 to the command unit 24. The subject 28 in many instances will be a user moving his or her arms with the optical signals 26 being light reflected off of the subject 28.

The command unit 24 has an input which receives the frame data 30 from the optical detector unit 22 and processing circuitry (not shown in FIG. 1) which processes the frame data 30 and generates a command signal 32 based on the movement of the subject 28. The command unit 24 has an output which provides the command signal 32 to the control system 34. The control system 34 is in communication with a display unit 36 on which images are displayable, including a graphical user interface having at least one graphic to be controlled or animated by the command signal 32. The graphical user interface may incorporate any type of known graphic, for example, an animated character in a video game, a cursor on a computer screen, and so on, and the term "graphical user interface" as used herein shall include other types of user interfaces including textual and display user interfaces. Based on the command signal 32, the control system 34 generates a control signal 38 which modifies the images displayed on the display unit 36 by controlling the movement or position of a graphic of the graphical user interface. Accordingly, based on the motion of the subject 28, an image displayed on the display unit 36 may be modified and controlled.

Like all motion, the motion of the subject 28 includes both velocity and direction components. The command unit 24 is able to process the velocity and direction of the movement of the subject and uses this information to determine an appropriate command signal 32. The command signal 32 is then a function of the velocity of the movement of the subject 28. Accordingly, the subject 28 is able to control the graphical user interface on the display unit 36 as desired by varying the speed at which he or she is moving. This concept of velocity-based command generation will be discussed in more detail below.

Optical/Audio Command System

With reference to FIG. 2, the command system 20 may further include an audio detector unit 40 in communication with the command unit 24. The audio detector unit 40 receives audio signals 42 from the subject 28 and transmits audio data 44 to the command unit 24. The command unit 24 processes and interprets the audio data 44 and may incorporate this information in determining an appropriate command signal 32 to send to the control unit 34. The audio detector unit 40 preferably includes a microphone to receive the audio signals 42 from the subject 28. Accordingly, a subject 28 is able to control a graphical user interface not only by moving but also by speaking.

Subject-Positioning System

With continued reference to FIG. 2, another preferred embodiment of the motion-based command system 20 of the present invention may include a subject positioning unit 46. Depending upon the position of the subject 28 relative to the optical detector unit 22, the command unit 24 may generate a position command signal 47. The positioning unit 46 receives the position command signal 47 and generates a positioning signal 48 with a subject interface, which signal the subject 28 is able to interpret and change positions accordingly.

For example, if the subject 28 is too far removed from the optical detector unit 22 in order to ensure the most efficient operation of the system, then the command unit 24 will issued a position command signal 47 to the positioning unit 46. The subject positioning unit 46 in turn provides a positioning signal 48 via the subject interface, indicating to the subject 28 to move closer to the optical detector unit 22. The subject interface may signal to the subject 28 optically, for example, with light-emitting diodes (LEDs), or may be done alternatively with audible signals and so on. This feature of the present invention will be discussed in more detail below.

Exemplary Implementations of Command System

FIGS. 2, 3, 4, and 5 illustrate exemplary implementations of the motion-based control principles of the present invention. These exemplary implementations provide an idea of the wide range of applications of which the command system of the invention is capable.

Arcade Video Game

The present system may be implemented in an amusement-type video game 50 as shown in FIG. 3. The video game 50 has a housing 52 in which the components of the motion-based system are mounted. As is well known, video games commonly found in arcades have themes or scenarios based on, for example, martial arts and flight simulators.

The control system 34 of the video game 50 displays a graphical user interface, for example, an animated character (such as a martial arts master), on the display unit 36, which is typically a television-type monitor. The user of the video game then controls the movement of the character. Conventionally, the control of the character is performed with joysticks or buttons or a combination of both. However, according to the present invention, the control of the character is performed by the user moving parts of his or her body, for example, the limbs. Therefore, the subject 28 which is monitored by the optical detector unit 22 is the actual user.

In operation, the subject 28 is positioned in the field of view (FOV) with light passing through the aperture 25 to the optical detector 22, and observes a graphical and/or animated character displayed on the video display unit 36. If the subject 28 moves an arm, as shown by arrow A, the optical detector 22 senses this movement and sends the frame data 30 to the command unit 24. The command unit 24 in turn reads the frame data 30 and determines an appropriate command signal 32 based on the movement of the subject 28 (e.g., the right arm moving upward, as shown). The command unit 24 then generates the command signal 32 and sends it to the control system 34 of the video game 50. The control system 34 modifies the image displayed on the monitor 36 based on the command signal 32 by moving the animated character in the manner intended by the subject 28. For example, the upward movement of the right arm may generate a command signal 32 which makes the character displayed on the monitor 36 jump into the air; a sideways movement of the left arm may generate a command signal 32 which makes the character run forward. The subject 28 is able to simultaneously view this character modification and move to generate another command signal 32 accordingly to animate the character in a manner intended by the subject 28.

Home Video Game System

Figure 4:
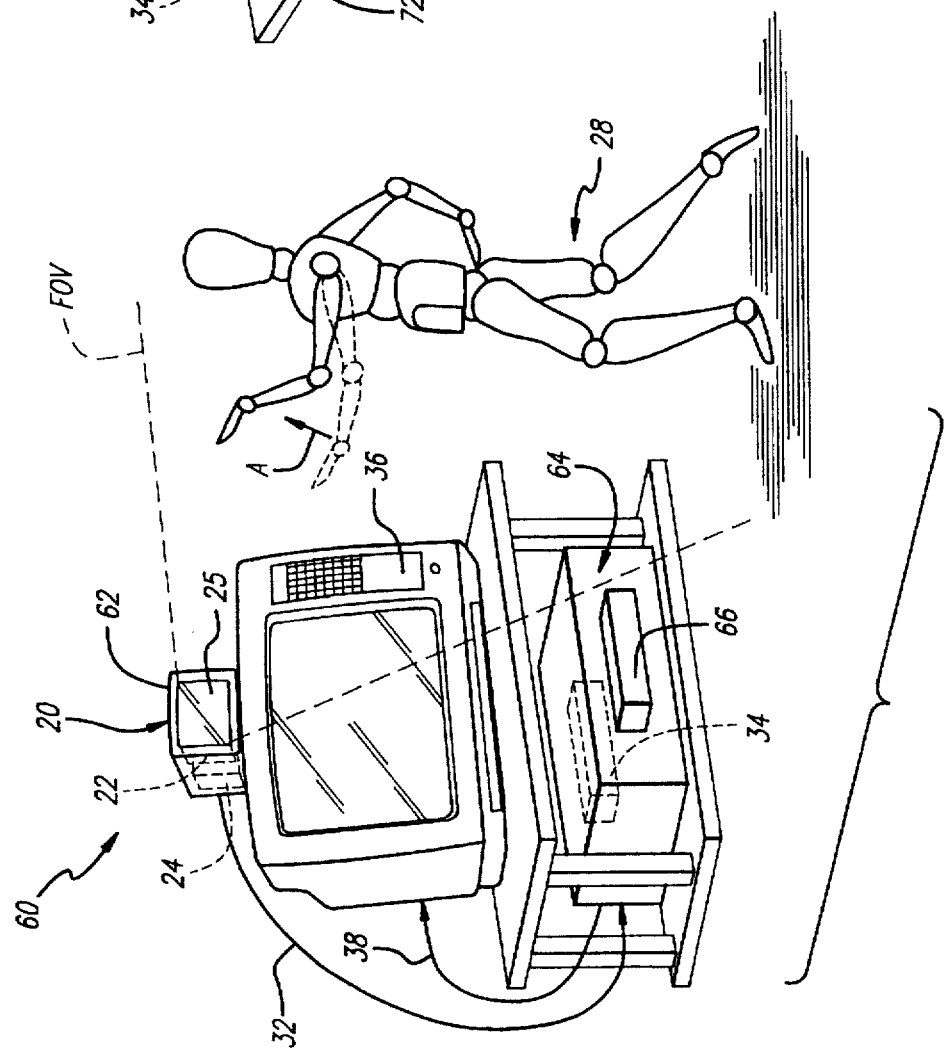
FIG. 4. is a diagrammatic view of an exemplary embodiment of a home video game system with an optical-based command system implemented in accordance with the present invention.

Another preferred implementation of the motion-based command system of the present invention is shown in FIG. 4. In this embodiment, the motion-based command system is implemented in a home-based video game system 60. The command system 20 is preferably contained in a housing 62 in which the optical detector 22 (with the aperture 25) and the command unit 24 are mounted. Alternatively, the optical detector 22 may be separable from the command unit 24 for preferential positioning by the user.

The command system 20 is connectable to a video game system 64 in which the control unit 34 is incorporated. The video game system 64 may include a port 66 in which various game cassettes are receivable. The port 66 is essentially an external read-only memory (ROM) drive. The game system 64 is connectable to the display unit 36, which, in this case, is a television. The operation of the home-based video game system 60 is carried out analogously to that of the arcade video game 50 with the user 28 positioned within the field of view.

The control system 20, or at least the command unit 24, may be easily coupled to existing game systems (e.g., Nintendo, Sega, Sony, etc.) by known adapters in the joystick socket on the particular game system. In making the command system readily applicable, owners of existing game systems only need to purchase the command system 20 mounted in the housing 62 and do not need to purchase a complete new game system. However, consumers in the market for a new game system may purchase a game system with the command system 20 already built in the game system with the optical detector unit 22 coupling to either a dedicated optical port on the game system or to the normal joystick port of the game system. In this way, the user may control the game scenario with either a joystick, the optical detector unit 22, or a combination of both.

Workstation System

With continued reference to FIG. 1 and additional reference to FIG. 5, yet another preferred implementation of the present invention is illustrated. In this embodiment, the command system 20 is configured in a computer workstation system 70 including a computer 72. The control unit 34 is preferably incorporated in the computer 72 and is in communication with the display unit 36 or monitor. The command unit 24 may be mounted on a board for insertion into an expansion slot on the motherboard of the computer 72 or may be a stand-alone unit as shown. If the command unit 24 is a stand-alone unit, it may easily be coupled to the computer 72 with a known adaptor, for example, an RS-232 adaptor. The optical detector 22 may also be attachable to the monitor 34 or configured as a stand-alone unit as shown. In the workstation embodiment, a cursor on the monitor 36 is the graphical user interface which is controllable by the movement of the subject 28, preferably the user's hand.

Virtual Reality System

With reference to FIG. 6, the motion-based command principles of the present invention are shown implemented into a virtual reality system 80. In this preferred embodiment, the optical detector unit 22, the command unit 24, and the control system 34 are preferably contained in a unitary housing 82 with the aperture 25 formed therein. The display unit 36 is contained in a helmet-like head unit 84 which fits on the user's head. In many virtual reality applications, it is preferable for the head unit 84 to be separate from the other components of the system 80. In those cases, in order for the display unit 36 to receive the control signal 38 from the control system 34, a transmitting antenna 86 first receives the control signal 38 and transmits the control signal, provided with reference numeral 38', to a receiving antenna 88 mounted to the head unit 84. In virtual reality implementations of the present invention, the optical detector unit 22 may include several cameras for monitoring the movement of the subject 28 to provide the most realistic movement control possible.

Other Implementations

The motion-based command system of the present invention may be implemented in many useful and commercially viable installations in industry. For example, in the security industry, surveillance systems may incorporated the optical detector unit. In this application, the command unit 24 may only generate a command signal 32 when motion is detected, that is, when an intruder is sensed by the optical detector unit 22, rather than continuously recording an area on video tape, for example. Accordingly, little power is used and costs are reduced, for example, in the storage of archival surveillance footage which is essentially eliminated. Also, the command unit 24 may be programmed to be able to distinguish between movement of various subjects, for example, between a cat and a human. Therefore, inadvertent setting off of alarms is avoided.

Many different forms of communication media may be used to connect the various components of the systems shown in FIGS. 3 to 6, including coaxial cable, twisted-pair cable, infrared transmitters and receivers, RS-232 connections, and so on. Furthermore, the optical detector unit 22 preferably includes a charge-coupled device (CCD) image sensor or camera but may also include other solid-state area sensors, such as an infrared detector array or a video camera, which will be discussed in more detail below.

Motion-Based Command Generation

As mentioned above, the speed and direction at which the subject 28 moves determines the command signal 32 for controlling a graphical user interface on the display unit 36. In other words, the command signal 32 is a function of the velocity and direction of the subject 28. For example, if an upward movement of the right arm of the subject or user 28 results in the character displayed on the monitor 34 jumping, then a slow upward movement may result in the character jumping slightly while a fast upward movement may result in the character jumping mightily. This principle will be discussed in more detail below.

Subject Frame Definition

Figure 7:
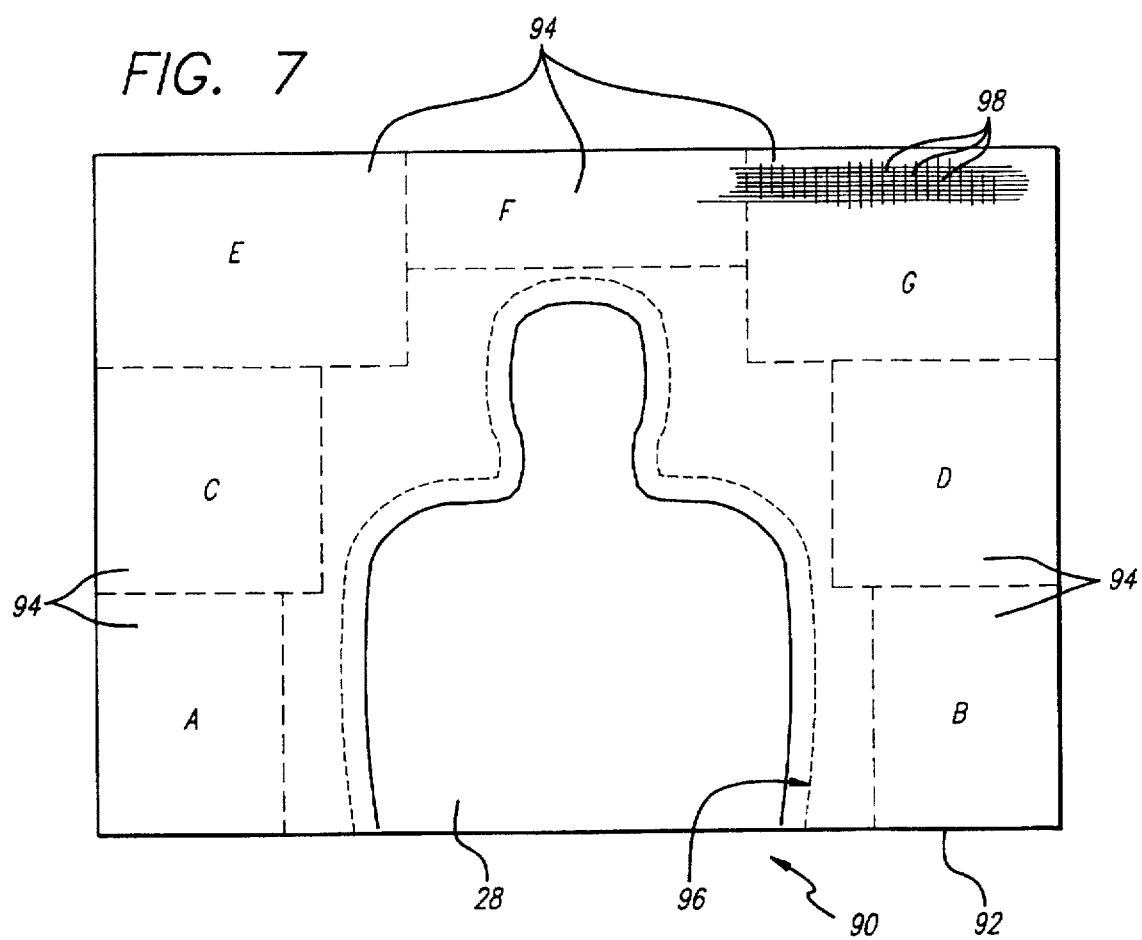
FIG. 7 is a view of a subject frame having a plurality of sub-regions and a subject positioned therein, illustrating optical-based command principles of the present invention.

FIG. 7 illustrates a subject frame 90 as viewed from the perspective of the optical detector unit 22 in, for example, the preferred embodiments illustrated in FIGS. 3, 4, and 6. The subject frame 90 is bound by a field-of-view limit 92 in which the subject 28 is viewed and monitored by the optical unit 22. The subject frame 90 is divided into at least one but preferably a plurality of sub-regions 94, each having a boundary as shown by the dashed lines and each being labeled with a letter A through G in FIG. 7. Each of the sub-regions 94 defines an area of the frame 90 in which motion of the subject 28 is monitored and processed. Although seven (i.e., A to G) sub-regions 94 are shown in the exemplary subject frame 90 of FIG. 7, there may be any desired number of sub-regions defined in the subject frame 90 by the system. Further, the size and shape of the sub-regions 94 may be modified during use, allowing the command system 20 to continue operating although the subject 28 is not centered or at the optimal distance in the subject frame 90.

The subject 28 defines an area of the frame 90 in which motion is not monitored or processed. Further, there may be defined around the subject 28 in the subject frame 90 a buffer zone 96, outlined by the dotted line in FIG. 7, in which movement of the subject 28 is not processed. The buffer zone 96 allows the subject 28 incidental movement or movement the subject 28 does not intend to generate a command signal. Any area of the subject frame 90 in which the subject 28 is not located is defined as the background of the frame 90.

The size and shape of the sub-regions 94 may be set and modified as preferred. For example, if the subject 28 is relatively distant from the optical detector unit 22 in the field of view, then the horizontal dimensions of the sub-regions 94 may be extended to be nearer the subject 28 within the subject frame 90. Conversely, if the subject 28 is relatively close to the optical detector unit 22 (as may be the case in the preferred embodiment illustrated in FIG. 5), then the horizontal dimensions of the sub-regions 94 will decrease. Similarly, the vertical dimensions of the sub-regions 94 will vary depending upon the vertical orientation of the subject 28. For example, if the subject 28 is relatively high in the subject frame 90, then the vertical dimensions of the lower sub-regions 94 (i.e., sub-regions A and B) will be extended, while those of the upper sub-regions 94 (i.e., sub-regions E, F, and G) will be compressed. In any case, a different command signal may be mapped to each of the sub-regions 94 so that subject movement within the different sub-regions 94 controls a graphic differently.

Regarding the optical detector unit 22, it is preferable for the optical detector unit 22 to include a CCD camera for detecting light from the subject 28. As known in the art, a CCD camera is an array of active area sensors which define a plurality of pixels 98. Each pixel 98 may be comprised of two active sensor areas and may range in size from 10 micrometers ($\mu$m) to 20 $\mu$m wide and 15 $\mu$m to 30 $\mu$m long. Many CCD cameras have a horizontal width and a vertical height of 300 pixels to 1,000 pixels. However, in the present invention, the sensing area of CCD camera of the optical detector unit 22 preferably, for cost considerations, has about 160 pixels in the horizontal direction (i.e., from sub-region E to sub-region G) and about 120 pixels in the vertical direction (i.e., from sub-region G to sub-region B).

Subject Frame Scan

For the sake of clarity in FIG. 7, the subject frame 90 is shown only partially divided into a plurality of pixels 98. The pixels 98 defined vertical fields or columns of pixels 98 and horizontal fields or rows of pixels 98. In operation, the CCD camera of the optical detector unit 22 may read the subject frame 90 by scanning the pixels 98, for example, from top to bottom in each column, which is known as a column scan, and by moving from right to left starting with the outermost column. However, the optical detector unit 22 may scan the pixels 98 and transfer the resultant data in any particular direction, as often dictated by the CCD unit used as the optical detector.

When the CCD camera has scanned the entire subject frame (known as a "frame scan"), the CCD camera repeats the process continuously at a predetermined frequency, such that there is a predetermined period of time between scans. Accordingly, the optical detector unit 22 provides frame data 30 to the command unit 24 indicative of the light received by the CCD at a particular instant of time, thereby providing the frame data 30 on a subject frame-by-subject frame basis. Accordingly, the frame data may be described as sets of data indicative of light received from the field of view at any given instant of time.

The command unit 24 saves the information from a previous frame scan until the present frame scan is completed, such that only the previous frame scan is saved, which will be discussed further below. The period of time between frame scans may be preferentially adjusted, for example, to compensate for low-light conditions. For each of the sub-regions 94, frame-to-frame velocity and frame-to-frame direction of the movement of the subject 28 (if any) are measured by the command unit 24, which will also be described in more detail below.

Figure 8:
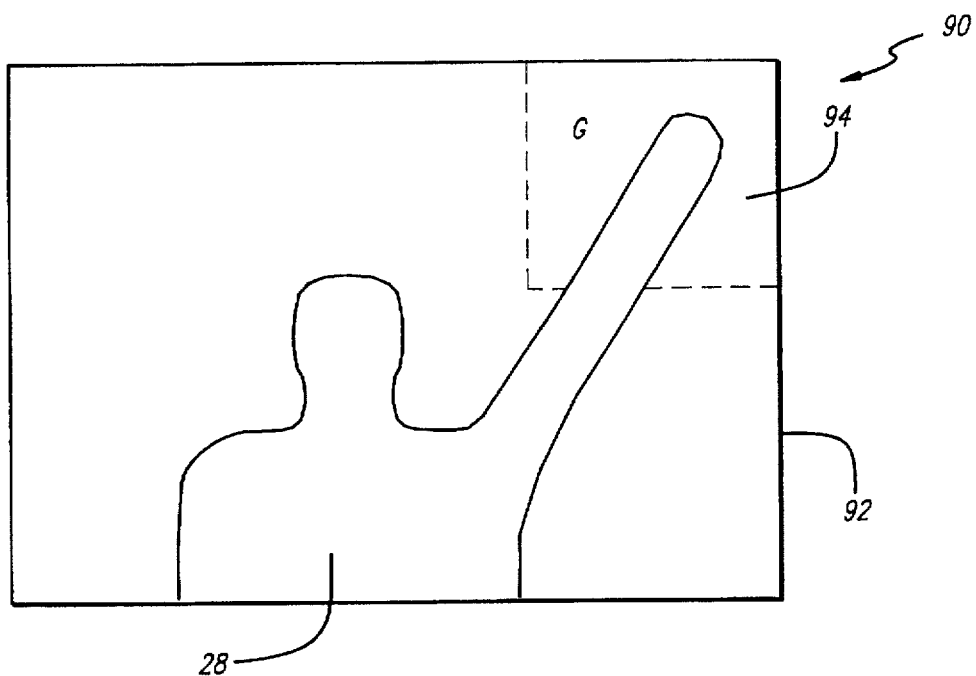
FIG. 8 is a view of a subject frame with a subject moving within a sub-region, illustrating principles of the present invention.

With reference to FIG. 8, the subject 28 is shown with an arm raised and located within sub-region G. With additional reference to FIG. 9, which is an enlarged view of sub-region G, arrow A indicates the direction of the column scan in the columns, and arrow B indicates the direction the column scan moves across the sub-region 94. As the column scan moves left from column to column, eventually the column scan reaches pixels on which illumination of the subject 28 is incident, which pixels are labeled 98'.

After each column scan, the scanning information from that particular column is sent to the control unit 24 in the form of digital data. This digital data comprises the frame data 30 sent from the optical detector unit 22 to the command unit 24, which frame data 30 is indicative of the values of the pixels 98 (and 98'). As mentioned previously, the data from the previous frame scan is saved in the command unit 24. When the optical detector unit 22 sends the frame data 30 from the current or present frame scan, the present value of each of the pixels 98 is compared to the previous value of the corresponding pixel, from which comparison a difference value is determined, which will be discussed in detail below.

Command Generation

Main Command Loop

Figure 10:
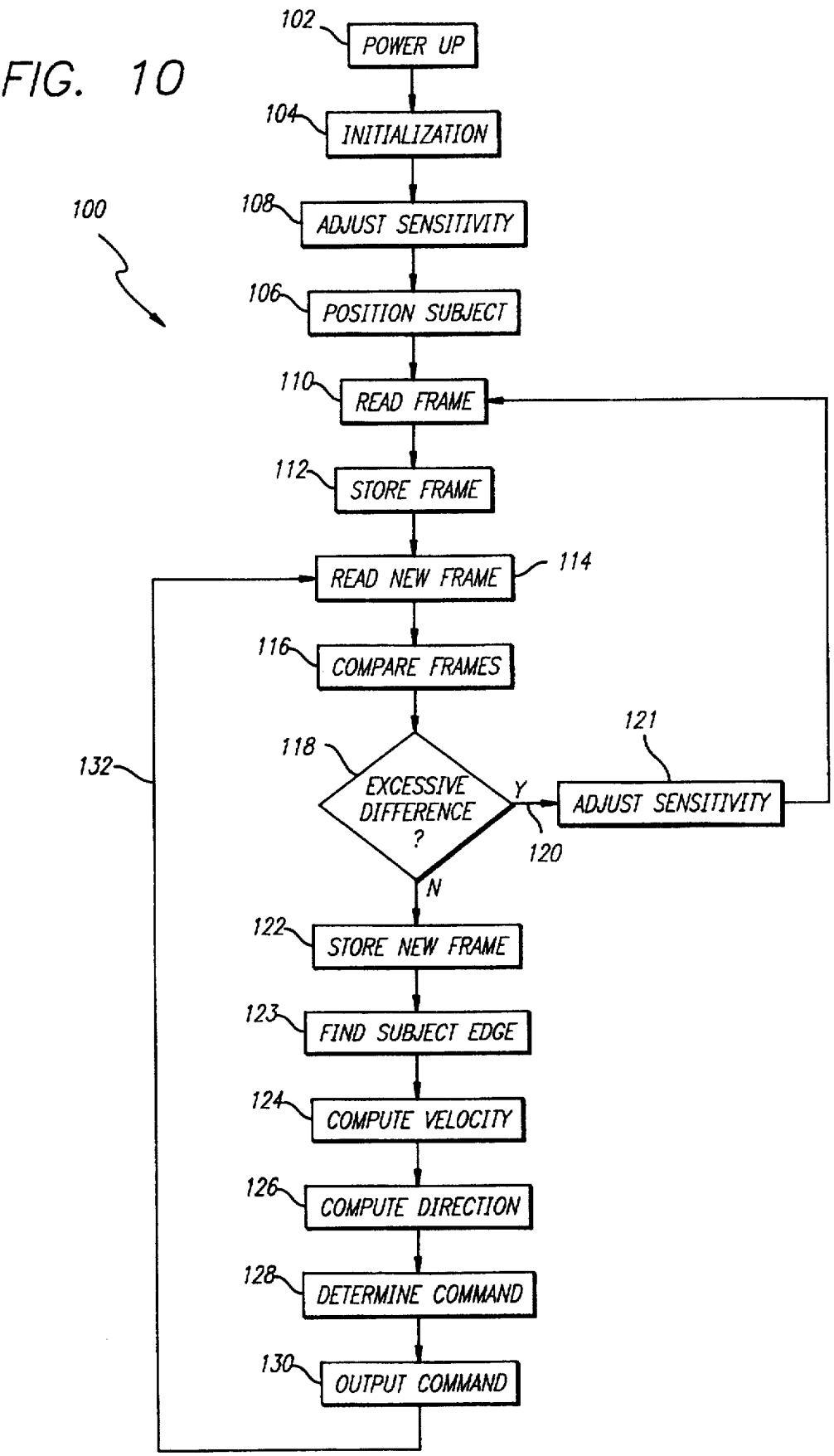
FIG. 10. is a flow chart of a main command loop for a command system according to the present invention.

With reference to FIG. 10, a main command loop 100 performed by the command system 20 in accordance with the motion-based command principles of the present invention is illustrated. Upon power up (block 102) of the command system 20, the subject frame 90 with the subject 28 is initialized (block 104). This includes reading any ROM cartridge which may be inserted in the port 66 of the embodiment of FIG. 4 to determine which game is to be played; defining sub-regions 94 within the subject frame 90; defining velocity profiles of the subject 28; and so on. Upon initialization, the command system 20 may be calibrated, which includes adjusting the sensitivity of the optical detector unit 22 (block 108), and the subject 28 may be positioned in the subject frame 90 (block 106).

For optimal operation of the system, the subject 28 should be properly positioned in the subject frame 90 (block 106) within the defined sub-regions 94. In order to do this, light (i.e., optical signal 26) from the subject frame 90 with the subject 28 positioned somewhere therein is incident on the optical detector unit 22. The optical detector unit 22 generates the frame data 30 indicative of the light from the subject frame 90. The command unit 24 then determines whether or not the subject 28 is properly positioned within the subject frame 90. If the subject 28 is not optimally positioned within the subject frame 90, then the command unit 24 in conjunction with the subject positioning unit 46 corrects the position of the subject 28.

Before the subject 28 is tested for correct position, the sensitivity of the optical detector unit 22 may be adjusted (block 108). To adjust the sensitivity, the command unit 24 receives and processes the frame data 30 from the optical detector unit 22. The value of the frame data 30 is indicative of the amount of light incident on the optical detector unit 22. As it is not practical to control the ambient lighting of the environment in which the subject 28 is located, the sensitivity of optical detector unit 22 is adjusted according to the lighting conditions of the subject 28, i.e., the value of the frame data 30.

More specifically, the command unit 24 compares the value of the frame data 30 to a predetermined and adjustable lighting threshold value. If the command unit 24 determines that too much light from the subject frame 90 is incident on the optical detector unit 22 (that is, the value of the frame data 30 exceeds the lighting threshold), then the command unit 24 decreases the sensitivity of the optical detector unit 22. Conversely, if the command unit 24 determines that too little light from the subject frame 90 is incident on the optical detector unit 24 (that is, the value of the frame data 30 falls short of the lighting threshold), then the command unit 22 increases the sensitivity of the optical detector unit 22.

Upon positioning the subject 28 within the field of view (block 106) and completing the sensitivity adjustment (block 108), the control system 20 reads the subject frame 90 (block 110). To do so, the optical detector unit 22 senses the light incident thereon and sends the frame data 30 indicative of the incident light 26. The frame data 30 sent to the command unit 24 represents one "snapshot" or "frame" of the subject frame 90. The frame data 30 is then stored by the command unit 24 (block 112).

When the frame data 30 for the initially read frame is stored, the control system 20 reads the subject frame 90 again (block 114). The frame data 30 generated by the optical signal (i.e., incident light) 26 from the subject frame 90 is sent to the command unit 24. For the sake of discussion herein, the previously read and stored frame will be called the previous frame and the subsequently read frame will be called the present frame.

The command unit 24 now compares the present frame to the previous frame (block 116). This is generally accomplished by comparing the value of each pixel comprising the frame data 30 of the previous frame with the value of the corresponding pixel comprising the optical data of the present frame. With further reference to FIG. 7, if the subject 28 remained substantially stationary in both the previous frame and the present frame, for example, then the value of each pixel will be substantially the same between the frames, either for the background area or for the subject area. However, if there is a substantial difference in the values of the frame data 30 for the present frame, then the command unit 24 determines whether the number of "differences" between the present frame and the previous frame is acceptable.

For example, the command system 20 senses movement of the subject 28 and then determines the appropriate command signal 32 to send to the control unit 34. However, the command system 20 needs to distinguish movement of the subject 28 intended to generate a command signal from incidental movement of the subject or movement within the subject frame 90 not caused by the subject 28. Accordingly, if the subject 28 has remained substantially motionless, then a significant number of differences in the pixel values of the frame data 30 of the previous frame and those of the present frame may indicate movement in the background or a sudden change in ambient lighting conditions in the subject frame 90 resulting from, for example, a light being turned on or off, a door opening or closing, and so on. Therefore, the command system 20 will not view this difference in values as an intended command movement by the subject 28 and will not proceed with the processing of the present frame to generate a command signal, but the command system 20 will adjust the sensitivity of the optical detector unit 22 (block 108) once again.

In relation to the main command loop 100, upon comparison of the present frame with the previous frame (block 116), the command unit 24 determines whether the difference between the frames is excessive (block 118). If so, the control unit 24 re-adjusts the sensitivity of the optical detector unit 22, as shown by path 120 and by block 121, with the command unit 24 returning to the read-frame block 110 thereafter. If the difference between the frames is acceptable, signifying that any movement by the subject 28 is intended to generate a command signal, then the frame data 30 representing the present frame is stored (block 122) in the control unit 24 for comparison with the next frame, which will be discussed in more detail below.

Figure 11:
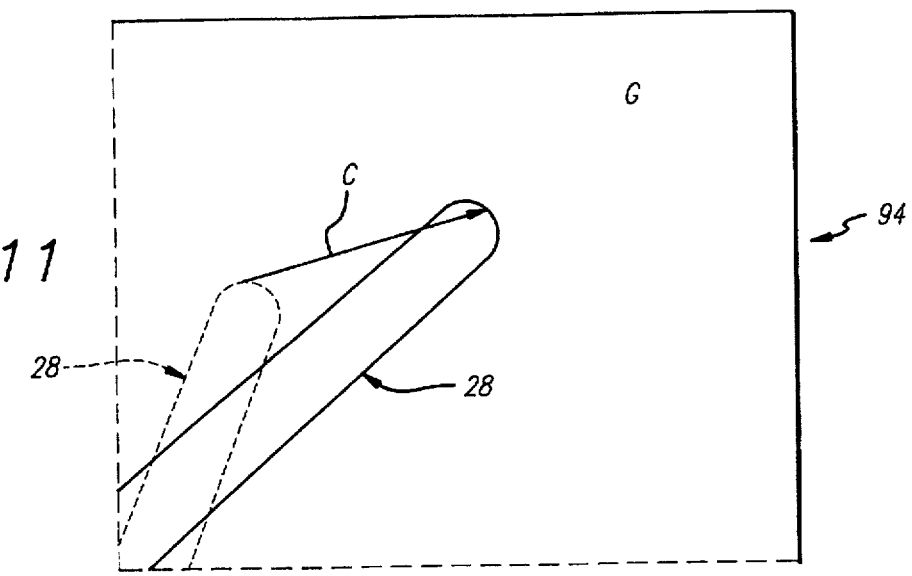
FIG. 11. is a view of a subregion of a subject frame showing the movement of a subject between a previous frame and a present frame, illustrating principles of the present invention.

At this point in the main command loop 100, movement of the subject 28 is analyzed. With continued reference to FIGS. 7 to 9 and additional reference to FIG. 11, exemplary command movement is shown by the subject 28 moving an arm in sub-region G. The command unit 24 first determines the pixels 98 in the sub-region 94 which define the edge of the subject (block 123). The position of the arm in the previous frame is shown in dashed line, and the position of the arm in the present frame is shown in solid line. Once the edge of the subject 28 is determined, then the position of the subject 28 in the previous and the present frame provide a base from which the movement may be analyzed. The movement of the subject 28 as read by the command unit 24 is indicated by command vector C, from which velocity and direction are computed (blocks 124 and 126).

Velocity can be determined from the difference in position between the two points defining the beginning and the ending of command vector C; that is, the position of the edge pixels 98 of the subject 28 in the previous frame and that in the present frame. As mentioned earlier, the period of time between reading frames is a known value which results from the frame-scanning frequency of the optical detector unit 22. For example, the optical detector unit 22 may have a frame-scanning frequency of 30 frames per second, which translates into a period of time between frames of about 0.033 seconds or 33 milliseconds (ms). Therefore, by calculating the difference in position and dividing by this period of time, velocity of movement between frames can be calculated as:

Velocity=(difference in position)/(period of time).

Equivalently, velocity may be calculated using the following equation with the frame-scanning frequency substituting the period of time:

Velocity=(difference in position)×(frame-scanning frequency).

Depending upon the implementation of the command system 20 in a video system (e.g., those shown FIGS. 3–6), velocity and direction may be calculated with varying degrees of accuracy. Highly accurate velocity and direction calculations may use high-resolution optical detectors and trigonometric vector analysis. However, for most applications, velocity and direction of subject movement may be simplified.

Figure 12:
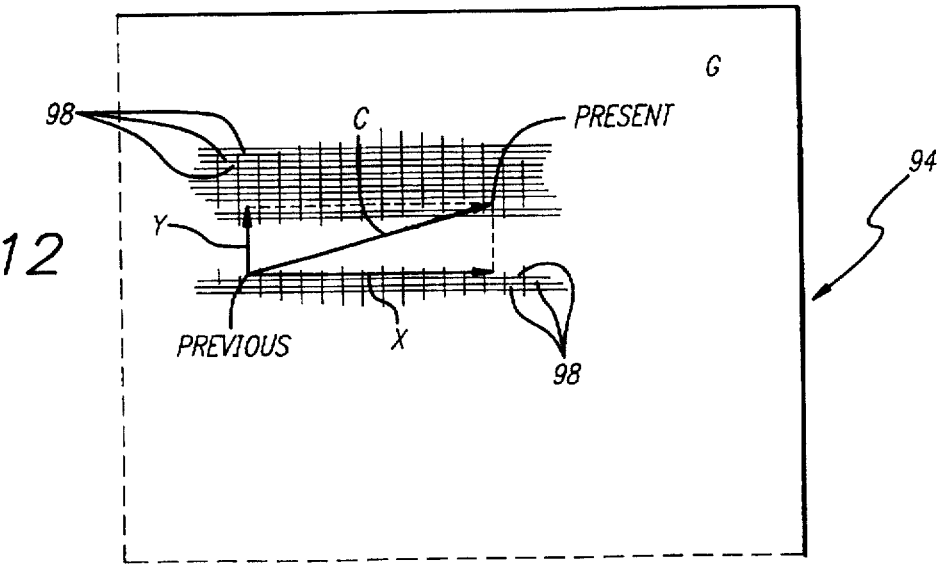
FIG. 12. is a view similar to that of FIG. 11, particularly showing velocity and direction vectors of the movement of the subject.

With reference to FIG. 12, using a Cartesian system, command vector C has an x and a y component, shown by direction vector X and direction vector Y. Upon receiving the frame data 30 from the optical detector unit 22, the command unit 24 determines which of the direction vectors has the greatest magnitude. In the example shown in FIGS. 11 and 12, the magnitude of direction vector X is greater than that of direction vector Y. The command unit 24 then disregards the influence of direction vector Y on command vector C and generates a command signal 32 based only on direction vector X. With particular reference to FIG. 12, the velocity of direction vector X in the example shown in these figures is about 330 pixels per second. This was calculated using a frame-scanning frequency of 30 frames per second with direction vector X extending 11 pixels: velocity=(11 pixels)×(30 frames per second)=330 pixels per second.

The difference in position may be calculated by other methods. For example, as shown in FIG. 12, vector C is the hypotenuse of a triangle formed by command vector C and direction vectors X and Y. Using the Pythagorean Theorem, the magnitude of the velocity is then:

$$|C|=(x^2+y^2)^{1/2}$$

After the command unit 24 has determined which of the direction vectors X and Y is greater and calculated of velocity of the greater direction vector, the command unit 24 then determines the command signal 32 to output to the control system 34 (block 128). In a martial arts video game, for example, sub-region G may be the sub-region of the subject frame 90 in which punching commands are read. If the magnitude of the velocity of the movement of the subject 28 is below a predetermined value, then the command unit 24 may output a command signal 32 (block 130) for a "moderate" punch. If the magnitude of the velocity is above this predetermined value but below another predetermined value, then the command signal 32 may be for a "hard" punch. Similarly, if the magnitude of the velocity is above this predetermined value, then the command signal 32 may be for an "extreme" punch. Accordingly, by the subject 28 varying the degree or "speed" of the "punching" movement, the command system 20 may output a range of command signals 32 indicative of this varying degree of movement.

After the command unit 24 has output the command signal 32 (block 130), the command system 20 reads a new frame (block 114) and the process repeats, as shown by path 132. A new frame is read (block 114), which becomes the present frame, with the present frame of the last comparison now the previous frame. Accordingly, the frame data 30 of only the previous frame needs to be stored, saving on memory and increasing the speed of operations. This efficient use of memory and expedient operation are further enhanced in that only a few representative pixels are used in the calculation of velocity, which will be discussed below.

Preferred Embodiment of Command System

Figure 13:
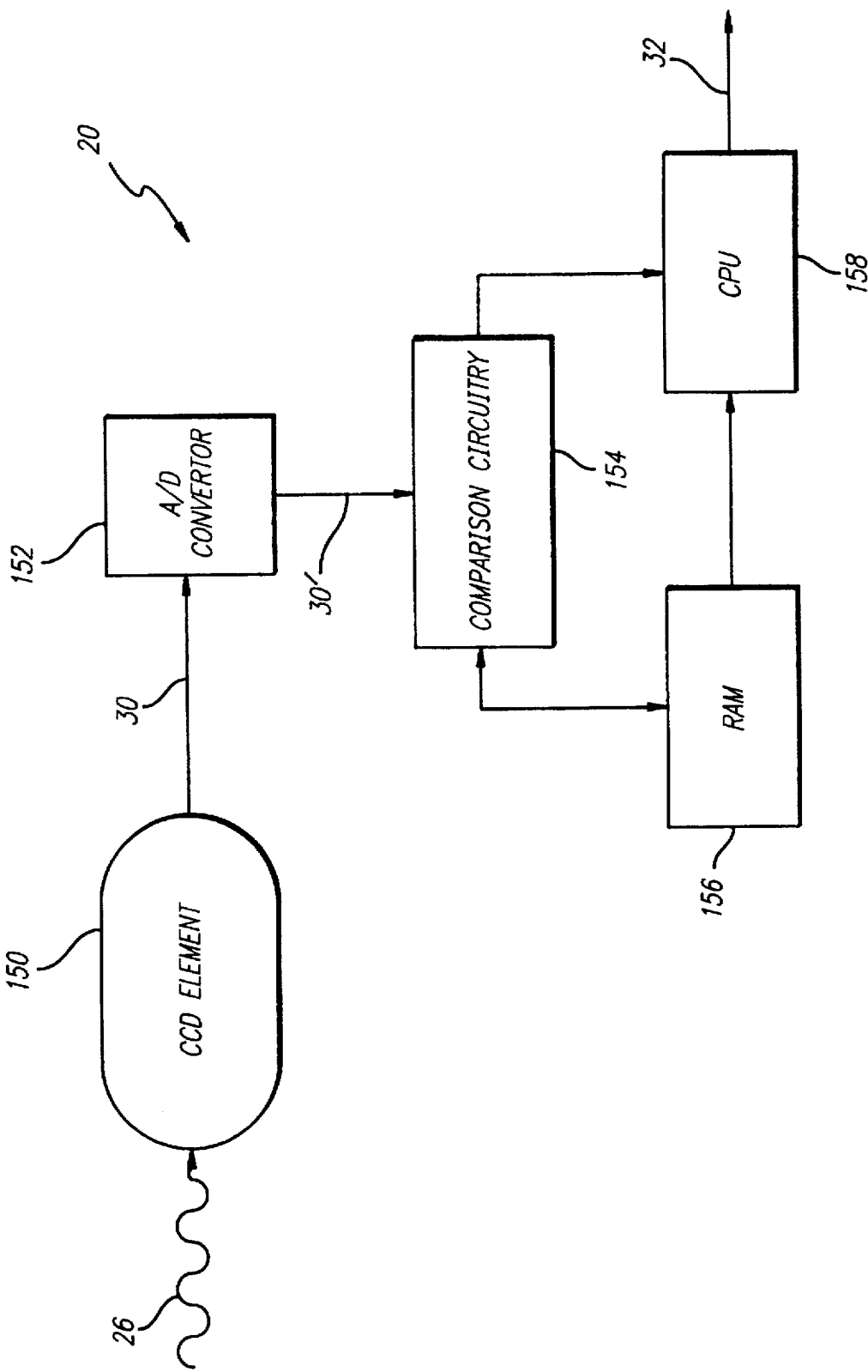
FIG. 13 is a block diagram of an exemplary embodiment of a command system implemented in accordance with the present invention.

With additional reference to FIG. 13, a preferred implementation of the command system 20 is shown. A charge-coupled device (CCD) 150 serves as the optical detector for the system, receiving light signals 26 from the subject. Data (i.e., the frame data 30) from CCDs is typically in analog form. Therefore, it is preferable to have an analog-to-digital (A/D) converter 152 receive and convert the analog frame data 30 and output digital frame data 30' to comparison circuitry 154. The comparison circuitry 154 is in communication with a random-access memory (RAM) 156 and a central-processing unit (CPU) 158. The RAM 156 and the CPU 158 are also in communication with each other.

In order to easily apply the principles of the present invention in as many embodiments as possible, it is preferable to have the CCD element 150, the A/D converter 152, and the comparison circuitry 154 located on a unitary custom command chip 160. A single chip manufacturer may fabricate the custom command chip 160 to be supplied to other manufacturers, for example, video game manufactures, in the market for such a motion-based command chip 160. Alternatively, any combination of the elements shown in FIG. 13 may be combined onto a single chip, for example, the comparison circuitry 154, the RAM 156, and the CPU 158, to be marketed to a wide range of users.

Figure 14:
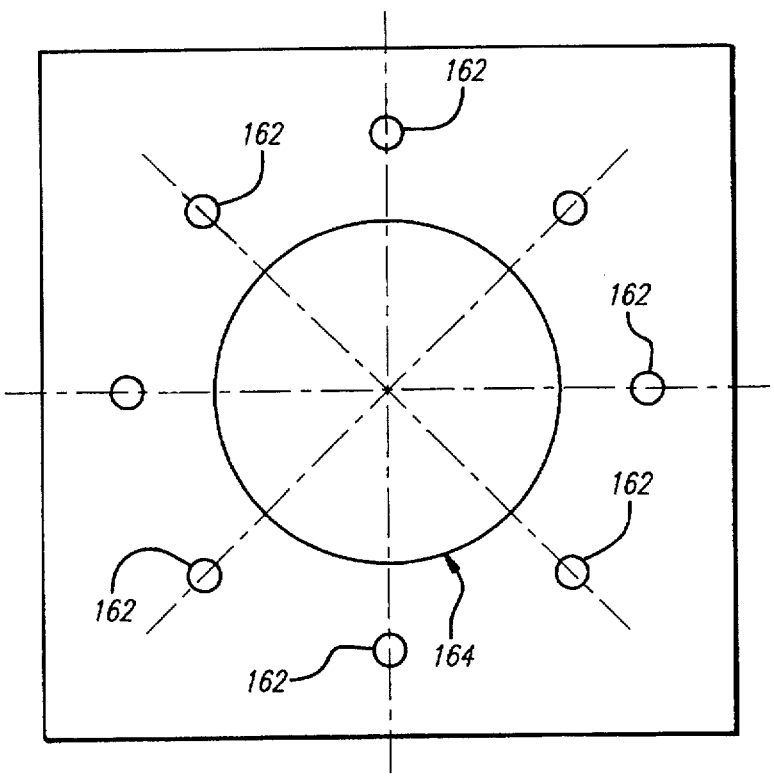
FIG. 14 is a diagrammatic view of an exemplary embodiment of a subject positioning unit implemented in accordance with the present invention.

With reference to FIG. 14 (and further reference to FIG. 2), an exemplary implementation of the positioning unit 46 in relation to the optical detector unit 22 and the command unit 24 is shown. In the preferred embodiment shown, the positioning unit 46 includes an array of LEDs 162 positioned around a lens 164 mounted in the aperture 25. The lens 164 focusses the optical signals or light 26 from the subject 28 onto the optical detector unit 22, which preferably includes the CCD element 150 as illustrated in FIG. 14. The lens 164 may also have a focal length so that the subject 28 is preferably positioned within an operable depth of field within the field of view of the optical detector unit 22.

The array of LEDs 162 is configured in a way which allows the subject positioning unit 46 to provide a positioning command signal 47 to one of the LEDs 162 to light, providing a positioning signal 48 to the subject 28. This positioning process will be discussed in more detail below.

Preferred Implementation of Main Command Loop

Position-Subject Loop

Figure 15:
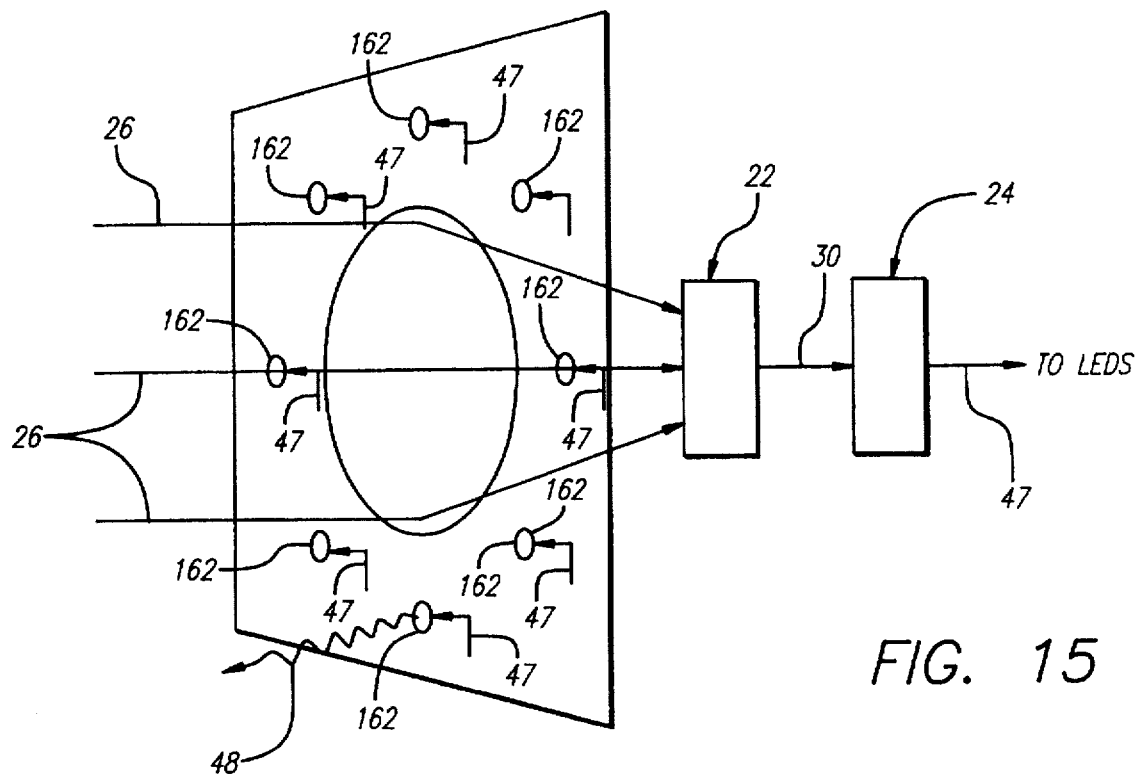
FIG. 15 is a view similar to FIG. 14, shown in a partial perspective view.
Figure 16:
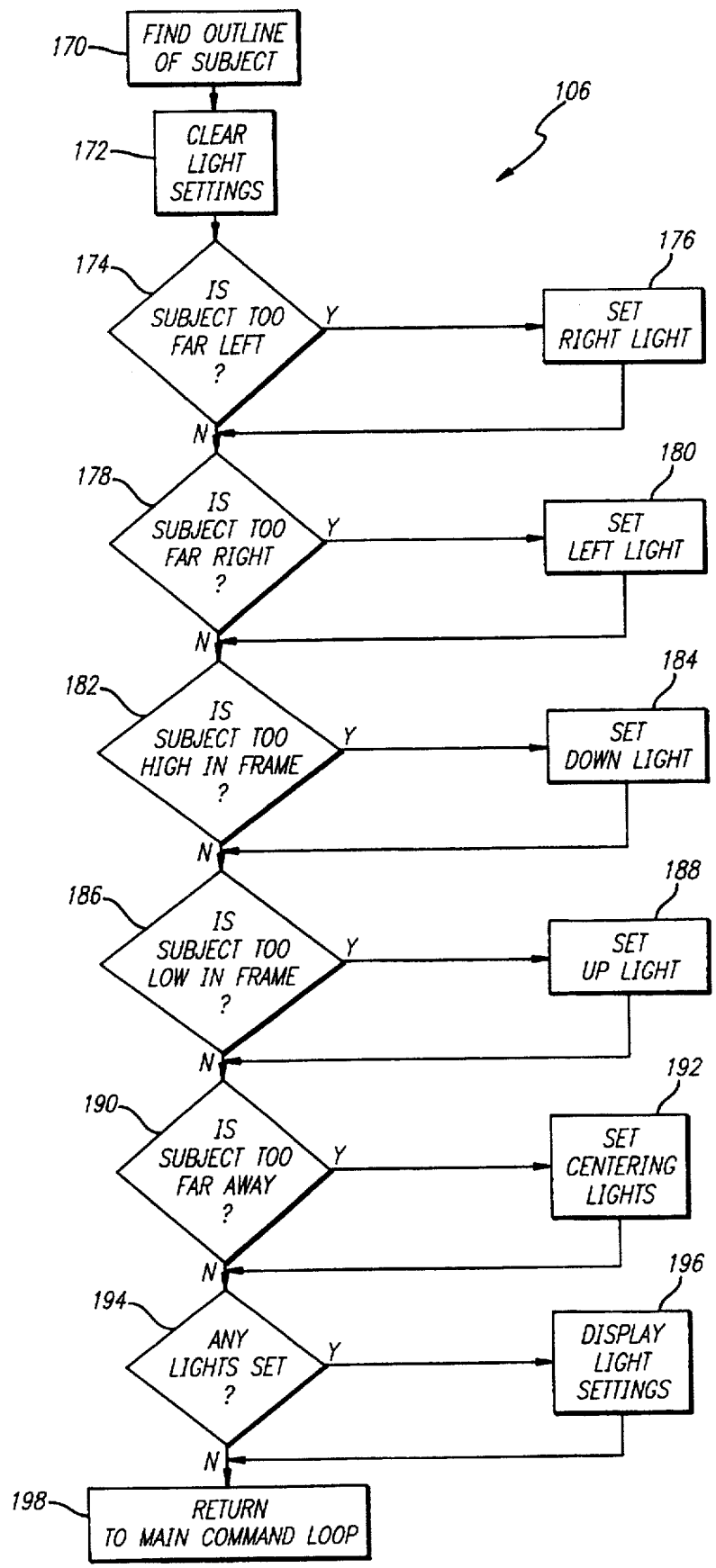
FIG. 16 is a flow chart of a subject-positioning loop for a command system implemented in accordance with the present invention.

With further reference to FIGS. 2, 14, and 15 and additional reference to FIG. 16, an exemplary embodiment of the position-subject loop 106 according to the present invention is shown. As mentioned above, the positioning unit 46 preferably has a subject interface in the form of an array of lights, e.g., LEDs 162, disposed in view of the subject 28. Initially, the command system 20 finds the outline of the subject (block 170) by determining the edge of the subject. One way to do this is to compare the values of the pixels and then to determine which of the pixels define the edge of the subject 28 against the background of the subject frame 90. These pixels are known as "edge" pixels. If not already done so, the command system 20 may clear the light settings of the array (block 172) at this stage in positioning the subject 28.

For proper performance of the command system 20, during initialization the subject 28 should not overlap any of the sub-regions 94 and should be centered within the subject frame 90. Accordingly, the command unit 24 now goes through a series of positioning steps, which may take place in any particular order. For example, if the subject 28 is too far to the left in the subject frame 90 (block 174), then the command unit 24 sends a positioning signal 47 to the subject positioning unit 46 to illuminate the LED 162 on the right side of the array of LEDs to indicate to the subject 28 to move to the right (block 176). Similarly, if the subject 28 is too far to the right in the frame 90 (block 178), then the position control unit 46 illuminates the LED 162 on the left side of the array (block 180) of the subject interface. The positioning unit 46 may continuously illuminate or flash the particular LED 162 until the subject 28 has moved sufficiently and is in the proper position with respect to that particular direction.

Along these same lines, if the subject 28 is too high in the subject frame 90 (block 182) (i.e., the subject 28 is overlapping sub-region F), then the LED 162 located on the bottom of the array is illuminated (block 184). If the subject 28 is too low in the frame 90, then the LED 162 located at the top of the array is lit (block 188). If the subject 28 is too far away from the optical detector unit 28 (block 190), then the subject positioning unit 46 illuminates LEDs 162 which communicate to the subject 28 to move closer, e.g., centering LEDs are lit (block 192).

Once the subject 28 is properly positioned within the subject frame 90, the subject 28 is allowed some degree of freedom of motion during operation which will not generate an unwanted command, which is shown by the buffer zone 96 in FIG. 7. However, in the event that the subject 28 moves out of position or out of the subject frame 90, the generation of commands may be suspended with the command system 20 returning to the initialization mode shown by blocks 104, 106, and 108 of the main command loop 100 of FIG. 10. The subject 28 may be notified of this by the flashing of all the LEDs 162 or by some other dedicated signal.

After performing these positioning steps, if any of the LEDs 162 are illuminated (block 194), then the LED settings are displayed (block 196). Upon completing this step, the command system 20 returns to the main command loop 100 (block 198).

An alternative approach to positioning the subject 28 within the field of view with positioning signals 48 may entail the utilization of the position command signals 47 by a motor mounted to the optical detector unit 22. Upon receiving the signals 47, the motor could automatically rotate the CCD or other camera to focus on the subject 28, rather than directing the subject 28 to move into the focus of the camera.

Adjust-Lighting Loop

Figure 17:
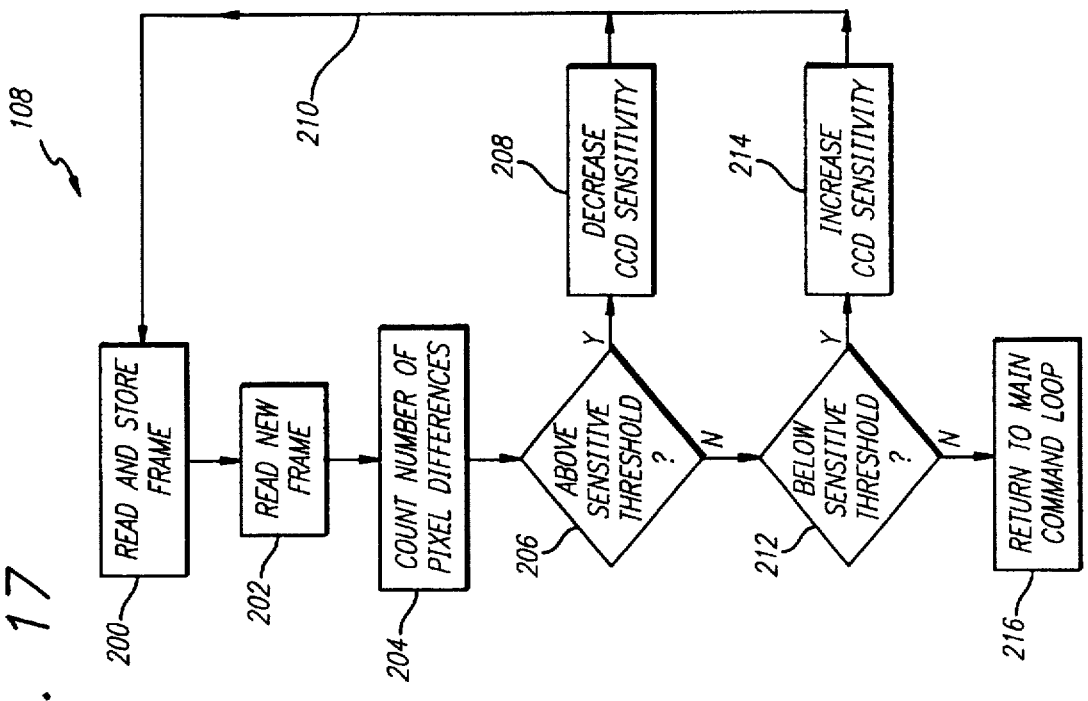
FIG. 17 is a flow chart of a lighting-adjust loop for a command system implemented in accordance with the present invention.

With reference to FIG. 17, after positioning the subject 28 within the subject frame 90, the command system 20 adjusts the lighting of the optical detector unit 22 (block 108) to compensate for changes in the ambient lighting of the area in which the subject 28 is located. As discussed previously, the command system 20 reads and stores a frame (block 200) and then reads a new frame (block 202). The command unit 24 then counts the number of pixels 98 which have a difference in value between the previous frame and the present frame (block 204). Preferably, the command unit 24 only looks at those pixels 98 located in the background of the subject frame 90, for example, in the upper corners of the subject frame 90 where the subject 28 is not positioned.

If the values of those counted pixels 98 exceed a predetermined sensitivity threshold (block 206), then the command unit 24 decreases the sensitivity of the CCD 150 of the optical detector unit 22 (block 208). The command system 20 then reads and stores another frame (block 200), as shown by path 210. If the values of the counted pixels 98 are below the predetermined sensitivity threshold (block 212), then the command unit 24 increases the sensitivity of the CCD 150 of the optical detector unit 22 (block 214). The command system 20 then reads and stores another frame (block 200) via path 210. If the values of the counted pixels 98 neither exceed nor fall below the threshold, then the command system 20 returns to the main command loop 100 (block 216).

Pixel-Comparison Loop

Figure 18:
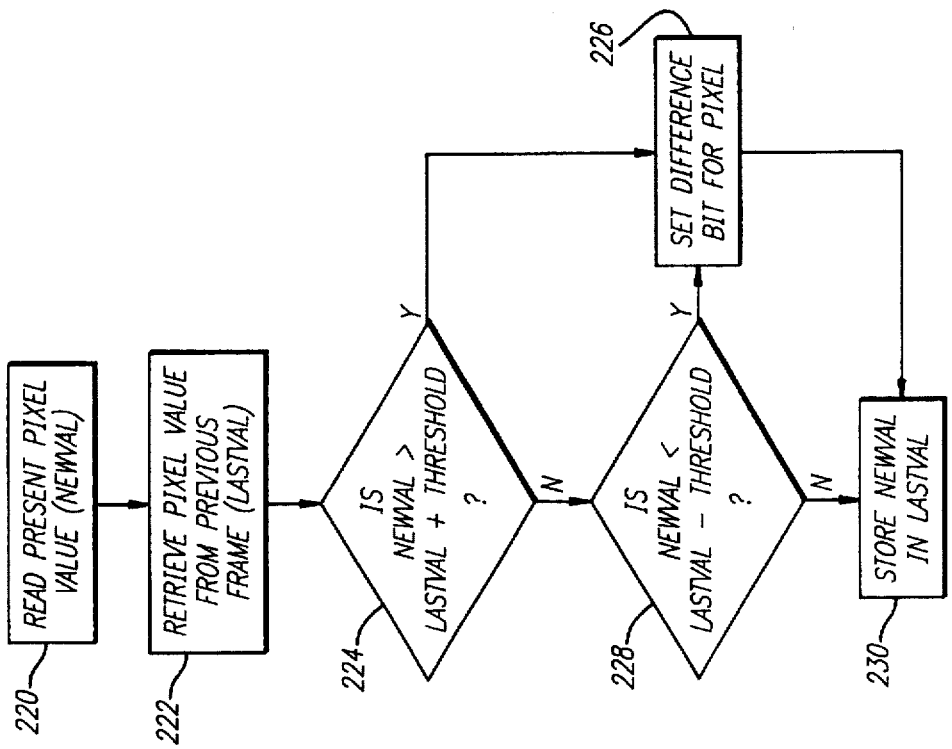
FIG. 18 is a flow chart of a pixel-comparison loop for a command system implemented in accordance with the present invention.

With additional reference to FIG. 18, exemplary steps for comparing the values of pixels 98 are shown. When the new frame is read (block 202), the value of each new pixel 98 is read (block 220). The command unit 24 then retrieves from storage the values of the pixels 98 from the previous frame (block 222). The command unit 24 then determines whether the value of each new pixel is greater than the sum of the value of pixel corresponding thereto in the previous frame and a predetermined threshold (block 224). If so, the command unit 24 then sets a difference bit for that pixel "ON" (block 226), e.g., assigns the difference bit a binary value of 5.

If not, the command unit 24 determines whether the value of the pixel is less than the difference between the value of the pixel corresponding thereto in the previous frame and the threshold (block 228). If so, the command unit 24 sets a difference bit for that pixel (block 226). If neither condition is met, then a difference bit is not set. The value of the corresponding pixel from the new frame is then stored, replacing the value of the pixel from the previous frame (block 230), which also takes place when a difference bit is set. Eight of the difference bits are preferably combined into a byte for efficient processing by the command unit 24. These bytes are labeled with reference numeral 99 in FIG. 9.

This pixel-by-pixel comparison process, or "difference test," may be performed by either digital circuitry in the command unit 24 or by the CPU 158 with appropriate software. Once the difference test for the pixels has been completed, the CPU 158 is able to process the difference data (i.e., the difference bits) efficiently, in that the difference bits for eight pixels are preferably combined into a single byte. Further, the threshold is preferably adjustable by the CPU 158 for varying lighting conditions in which the subject 28 is located. The threshold value should be set high enough to minimize the effect of "false" motion, i.e., motion not intended by the subject 28 to generate a command, but not so high as to overly de-sensitize the motion-detecting capabilities of the command system 20.

Subject Edge-Detection Loop

Figure 19:
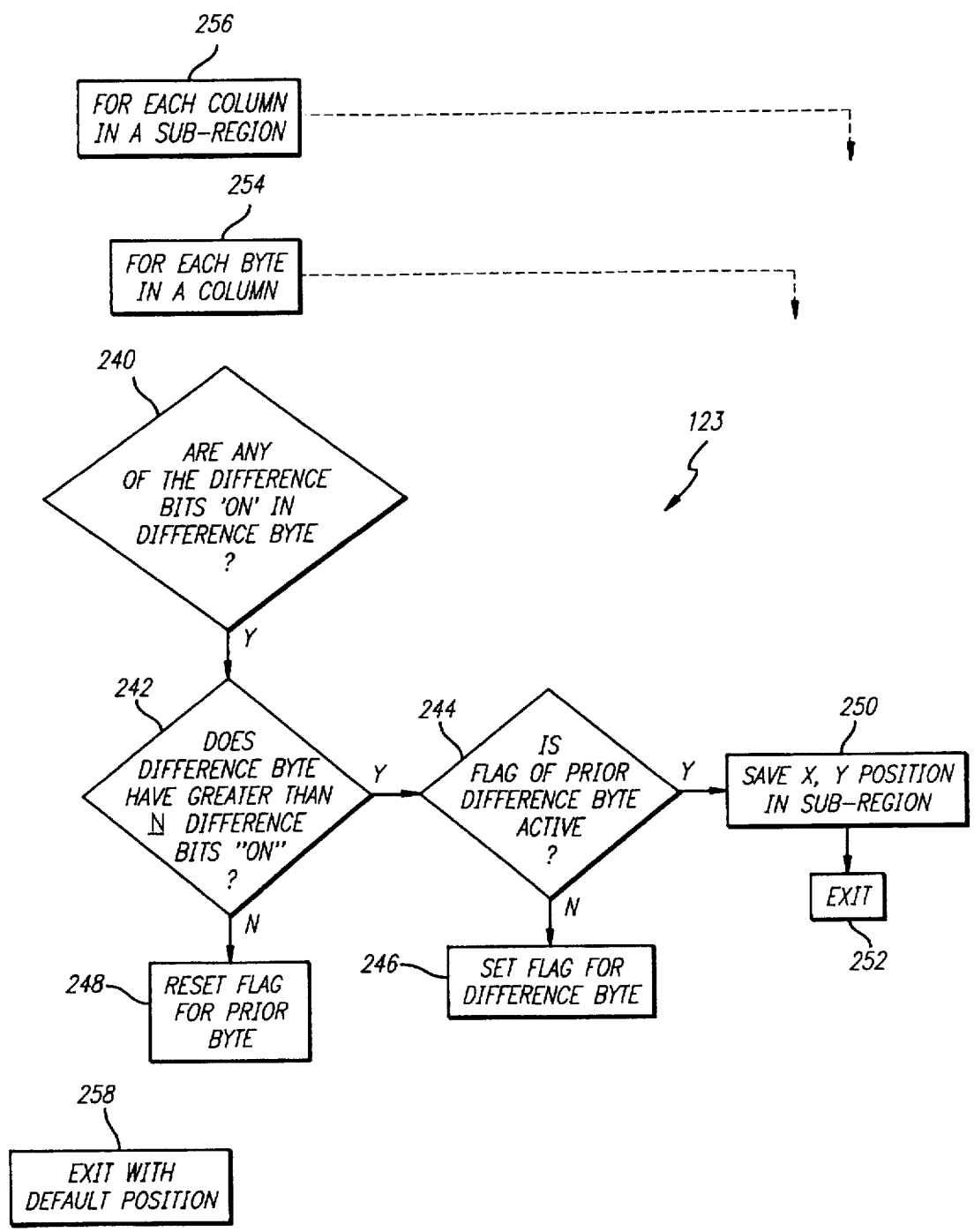
FIG. 19 is a flow chart of a subject edge-detection loop for a command system implemented in accordance with the present invention.

Reference is now made to FIG. 19 with continued reference to FIGS. 7 to 9. As discussed previously, to compute the velocity of the subject 28, the command unit 24 uses only the edge pixels of the subject. This greatly reduces the amount of data needed to be stored and processed, thereby increasing the speed and efficiency at which the command system 20 operates. Therefore, the edge of the subject 28 needs to be determined.

The results of the difference test of each of the pixels 98 is examined to determine the position of the subject 28 within the sub-regions 94. The one-bit result from the difference test of each pixel 98 is combined into a byte 99 including the one-bit results from seven other pixels. Accordingly, the difference bytes 99 allow examination of eight pixels at once to check for the presence of n number of adjacent pixels 98' where a difference in the value of the pixel 98' between the previous frame and the present frame has occurred.

Each of the columns of the subject frame 90 is divided into difference bytes 99 consisting of the difference bits of eight adjacent vertical pixels 98. If the subject 28 has not moved into or across a column, then there will be no difference bits ON in the byte. However, if the subject 28 has moved into a column, then there will be at least one of the difference bits ON. This is the case for the two bytes 99 outlined in bold in FIG. 9.

For each column in a particular sub-region 94 and for each byte 99 in a column, the control unit 24 first determines whether the byte 99 has any difference bits ON (block 240) as set in block 226 of FIG. 18. If so, it is then determined how many of the eight difference bits are ON. If there are more than a predetermined number (N) of adjacent bits which are ON (block 242), which is the case for the byte labeled 99', then the command unit 24 determines whether a flag of the previous byte 99 (i.e., the byte 99 just above byte 99') is active (block 244). If not, which is the case for byte 99', then the flag is set for that byte, i.e., byte 99' (block 246). If the number of adjacent difference bits ON in the byte 99 does not exceed N, then the flag of the previous byte 99 is reset (block 248). The predetermined number N may be adjusted from 1 to 8 to ensure that the best tradeoff between noise immunity and sensitivity of the command system 20 is made.

After setting the flag for byte 99', the command unit 24 then returns to block 240 for the next byte 99 down in the column (block 248), i.e., byte 99" below byte 99'. In this case, the number of difference bits ON for byte 99" is also greater than N, such that block 242 is affirmative. It is then determined whether the flag of the previous byte, that is, byte 99', which is active in this example, such that blOCk 244 is affirmative. By requiring the two adjacent bytes to satisfy the criterium of having at least N difference pixels 98' minimizes the negative effect of spurious noise-induced triggers in the CCD unit 150.

The command unit 24 has now determined that there are two adjacent bytes 99 in which the number of difference bits ON exceeds N and that these two bytes 99' and 99" are located at the edge of the subject 28. The command unit 24 then saves the x and y position (or coordinates) of those edge pixels 98' of the subject 28 in that particular sub-region 94 (block 250), and exits the loop (block 252). By knowing the position of the subject 28 in the previous frame, the command vector C in FIGS. 11 and 12 may now be determined, and velocity of the movement of the subject 28 may be calculated.

As long as there are no two adjacent bytes in which the number of difference bits exceeds N, the process described above continues for each byte 99 in the column (block 254) and for each column in the sub-region 94 (block 256). If the bytes 99 in all the columns have been analyzed without detecting motion of the Subject 28, then the command unit 24 exits the loop with a predetermined default position (block 258).

This process is performed for each of the sub-regions 94 in the subject frame 90. As each of the sub-regions 94 may be initialized for a specific type of command, e.g., punching, kicking, running, and so on in a martial arts scenario, the x and y positions of the edge pixels are saved for each sub-region 94 so that the velocity of the subject 28 in each sub-region 94 may be calculated. In processing the difference bytes 99 in each sub-region 94, the outer column is scanned first with the scanning proceeding toward the center of the subject frame 90. Thus, for the sub-regions 94 located on the left side of the subject frame (i.e., sub-regions A, C, and E), the scanning moves from column to column from left to right. For sub-regions B, D, and G, the scanning moves from right to left.

Command-Generation Loop

Figure 20:
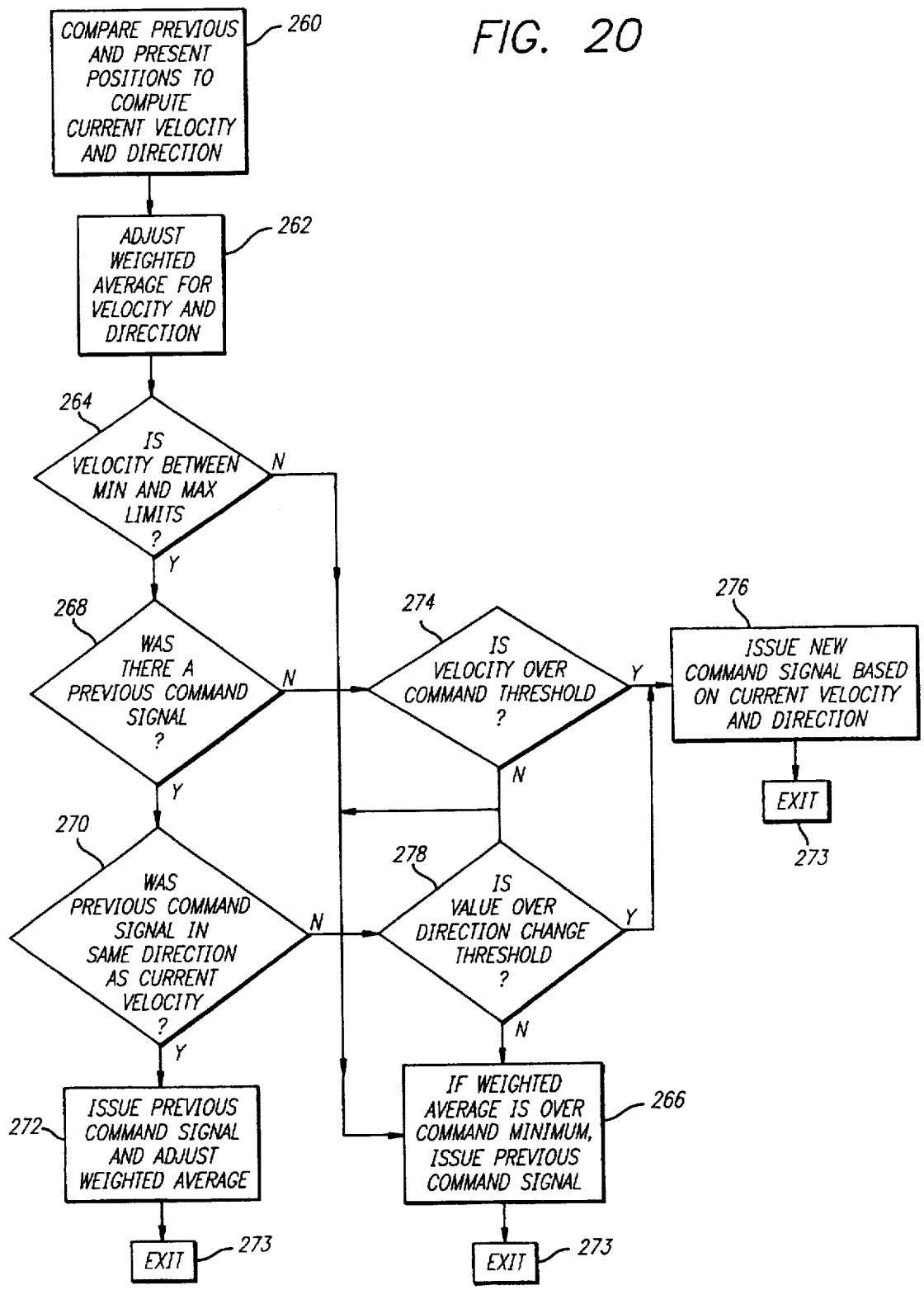
FIG. 20 is a flow chart of a velocity-calculation loop for a command system implemented in accordance with the present invention.

With reference to FIG. 20, the x and y positions of the edge pixels 98' saved in block 250 in FIG. 19 are compared to the x and y positions of the previous frame (block 260) to compute the velocity and direction of the movement of the subject 28. As discussed in reference to FIGS. 11 and 12, command vector C is defined between the previous x and y positions and the present x and y positions, from which vector the velocity and the direction are computed.

A weighted average of velocity and direction may be maintained by the command unit 24. This weighted average compensates for a large disparity in velocity and direction between frames. For example, if, during the process of playing a martial arts video game, the subject 28 was initially consistently making repeated fast and substantially vertical command movements in a particular sub-region 94, but now the subject 28 made a command movement which was slower and more horizontal. This may indicate that the subject 28 is getting tired and unable to make the desired fast command movement. However, by maintaining the weighted average of the previous command movements, the command unit 24 is able to adjust the command velocity threshold to compensate for overall slowing (or speeding up) of the velocity at which the subject moves, as observed from ongoing weighted averages. Accordingly, upon computing the velocity and direction (block 260), the weighted average of velocity and direction may be adjusted (block 262) if necessary to compensate for user fatigue.

The weighted average is preferably a running average of velocities for a sub-region 94. This running average helps string together the varying velocities that make up a single motion of the subject 28. A set of relatively high (fast) velocities will increase the average by a greater degree, thereby holding the command for a longer amount of time. A set of relatively low (slow) velocities will increase the average by a lesser degree, thereby holding the command for a shorter amount of time.

Command threshold values for interpretation of velocity can be adjusted to suit the subject 28 or method of operation, based upon the history of weighted averages. For example, the command thresholds could be lowered after the subject 28 has been operating the system for an extended period of time in order to compensate for the subject 28 getting tired. Alternatively, the command thresholds could be increased when the subject 28 moves closer to the optical detector unit 22, which has the effect of increasing the perceived velocity.

Next it is determined whether the magnitude of the velocity is between predetermined maximum and minimum thresholds or limits (block 264), thereby defining a predetermined range. By having a maximum limit, if the calculated velocity far exceeds what is reasonably possible, then the movement responsible for this extraneous velocity is ignored by the command unit 24. The command unit 24 then issues the command signal 32 from the previous frame (block 266). In other words, the command unit 24 acts as if no movement took place. Similarly, if the calculated velocity falls below a minimum limit, then the command unit 24 assumes that the movement responsible for this velocity was insignificant or that there was a lock of subject motion. The command unit 24 then compares the weighted average to the command threshold to determine whether the command signal 32 from the previous frame can be issued (block 266).

If the velocity is between the minimum and maximum limits, then it is determined whether a command signal 32 was issued by the command unit 24 for the previous frame (block 268). If there was, the command unit 24 determines whether the previous command signal 32 was in substantially the same direction as the movement of the present frame (block 270). If so, then the previous command signal 32 is issued and the weighted average is adjusted (block 272), with the command unit 24 exiting the loop thereafter (block 273).

Returning to block 268, if the velocity is between the limits but there was not a previous command signal 32 issued by the command unit 24, then it is determined whether the magnitude of the velocity is over a command threshold (block 274). If it is, then a command signal 32 is issued based on the velocity and direction of the present frame (block 276), with the command unit 24 exiting the loop thereafter (block 273). If it is not, then the loop returns to block 266 in which the command unit 24 issues the command signal from the previous frame if the weighted average is over the command minimum.

Returning to block 270, if the previous command signal is not in the substantially same direction as the present movement, then this indicates that the magnitude of the velocity changed between direction vectors X and Y. In the example shown in FIG. 12, the command signal would be based on velocity which had a greater magnitude in the x direction. However, if in the next frame, the magnitude in the y direction were greater than in the x direction, or in a reversed direction from the previous frame, then this would indicate a change in direction of the command movement. If the value of the velocity in the new direction does not exceed a predetermined direction-change threshold (block 278), then the loop returns to block 266 to test for the issuance of the previous command. However, if the value does exceed the change-direction threshold (block 278), then the loop returns to block 276 to issue a new command signal 32 based on the velocity and direction of the present frame.

The format of the command system 20 may be varied for any particular application or video game system, with this format dictating how the command signals 32 are interpreted by the control system 34. For example, for ON/OFF button-based inputs common to many video games, sequenced button streams could be issued by the control unit 34 upon receiving the command signal 32 in the manner of a martial arts game such as Mortal Combat™. Alternatively, an analog output of the command signal 32 could be generated with the magnitude of the command signal 32 proportional to the velocity of the subject 28. Further, in virtual-reality game systems, multiple cameras may be used, such that velocity may also be calculated in a third direction (e.g., the z direction).

Another command-signal scenario for button-based inputs is a pulse-width modulation approach. In this case, the control system 34, receiving the command signal 32, could "hold down" the button proportionally longer or shorter depending upon the magnitude of the velocity.

Another example of command generation is a mapping method. For example, an entirely different command signal 32 could be generated by the command unit 24 if velocity of the subject 28 has exceeded a certain velocity threshold. In the case of an aerial simulator or combat game, smooth side-to-side movement by the subject 28 could be interpreted to mean directional control or steering. A sudden jerking movement by the subject 28 exceeding the velocity threshold could trigger a command signal 32 which would fire a rocket.

Those skilled in the art will understand that the preceding description of the exemplary embodiments of the present invention provides the foundation on which numerous alternatives and modifications may be based. Such alternatives and modifications are also within the scope of the motion-based technology of the invention presented herein. Thus, by way of example and not by limitation, the following embodiment which incorporates alternatives and modifications of the motion-based technology of the present invention is provided and described. Accordingly, the invention is not limited to those embodiments precisely shown and described herein.

Alternative Embodiment

Figure 21:
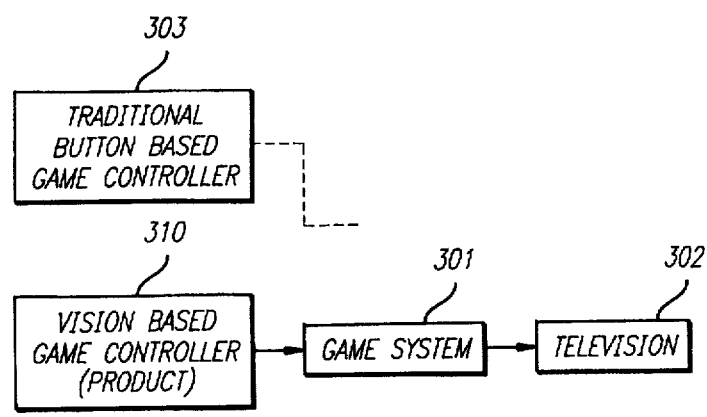
FIG. 21 is a block diagram showing connection of a controller to a computer games system and television in accordance with another exemplary embodiment of the present invention.

In FIG. 21 there is shown a game system 301 as an example of a computer. The game system 301 is connected to a television or monitor 302. Traditionally, a button-based game controller 303 such as a joystick has been connected to the games system 301. The button-based game controller 303 is replaced by a controller 310 in accordance with the present invention.

Figure 22:
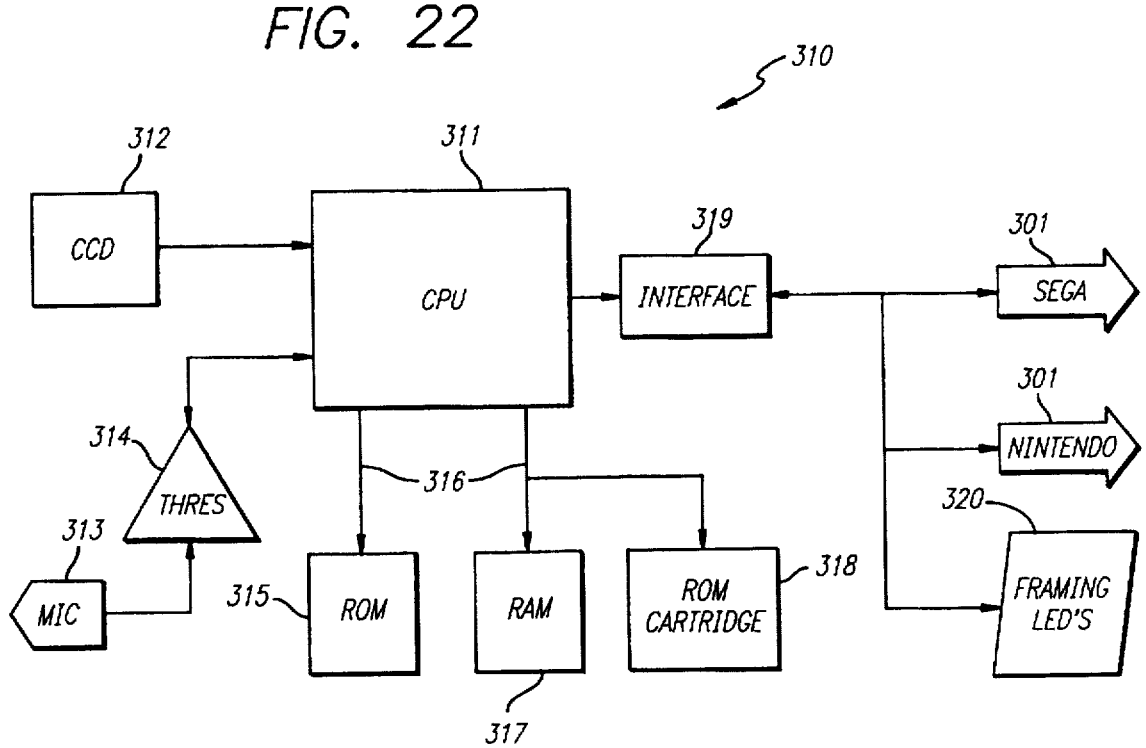
FIG. 22 is a block diagram of the components of the controller of FIG. 21.

With additional reference to FIG. 22, the controller 310 has a central processor unit (CPU) 311. The CPU 311 is preferably a CMOS so as to minimize the power requirements for the controller 310. The CPU 311 may have a 16 bit internal architecture with an 8 bit external connection.

A charge-coupled device (CCD) 312 is able to receive light from the environment of the controller 310 and provide signals to the CPU 311 in a known manner. The CCD 312 may have an on-chip analog-to-digital converter which has a parallel data output to allow direct connection to the CPU 311. The CPU 311 asserts the address of the pixel for which information is required and the CCD 312 accordingly supplies the 8 bit gray level value for that pixel to the CPU 311. Instead of having an on-chip analog-to-digital converter, a stand alone CCD could be used with an external analog-to-digital converter. The external circuitry can be synchronized with the addressing cycle of the CPU 311 for sequential access of the required information.

Another input device to the controller 310 is a microphone 313. The microphone 313 may be connected to the CPU 311 by a bandpass circuit and threshold circuit 314. The bandpass circuit filters the signal input from the microphones 313 in order to discriminate a spoken phrase from other sources of background noise. A digital signal is output to the CPU 311 from the bandpass circuit and threshold circuit 314 to indicate the presence of the user's phrase. A control loop is preferably set up within the CPU so that the threshold level of the bandpass circuit and threshold circuit 314 can be adjusted by the CPU 311. This therefore provides a variable threshold level which can be adjusted automatically by the CPU 311 depending on the software application running on the computer or game system 301 or according to the level of background noise in the user's environment, for example.

A read only memory (ROM) 315 is connected to the CPU 311 by address and data buses 316. The ROM 315 stores the executable image of the software used by the controller 310. Similarly, a random access memory (RAM) 317 is also connected to the CPU via a further address and data bus 316. The RAM 317 is used primarily for storage of a reference image which is used by the CPU 311 to detect motion, as will be described further below. As will be understood, the CPU 311 may have sufficient memory capacity to eliminate the need for an external ROM 315 and/or RAM 317.

There is a facility for a further plug-in ROM cartridge 318. The use of an additional ROM cartridge 318, connected to the CPU 311 via a card slot, allows the user to install further software, for example for specialized or particular software applications under control of the controller 310 or to receive software updates for the software in the controller 310. The ROM cartridge 318 consists of a ROM mounted on a printed circuit board for connection to the CPU 311.

The CPU 311 is connected to an interface 319. The interface 319 accepts the output control signals from the CPU 311 and matches the level of those signals to the game system or other computer 301 being controlled. The interface 319 also buffers the power taken from the game system or computer 301 being controlled in order to provide an appropriate power supply to the controller 310. The use of CMOS electronic components in the controller 310 where possible enables the controller 310 to function with the minimum of power taken from the game system or computer 301.

As well as the level setting and buffering circuits on the interface 319, the interface 319 may also provide the physical connection to the game system or computer 301 to be controlled. This connection may consist of a standard joystick connection or similar, or may be a DIN or coaxial connection, for example. A variety of different connectors may be provided with the controller 310 so that the user can use the appropriate connector for the game system or computer 301 being controlled. The interface 319 may be configured to provide a RS232 type signal which is typical of many computer/mouse connections. These connections, as well as the level matching and buffering aspects of the interface 319, will be well understood by a person skilled in the art.

Figure 23A:
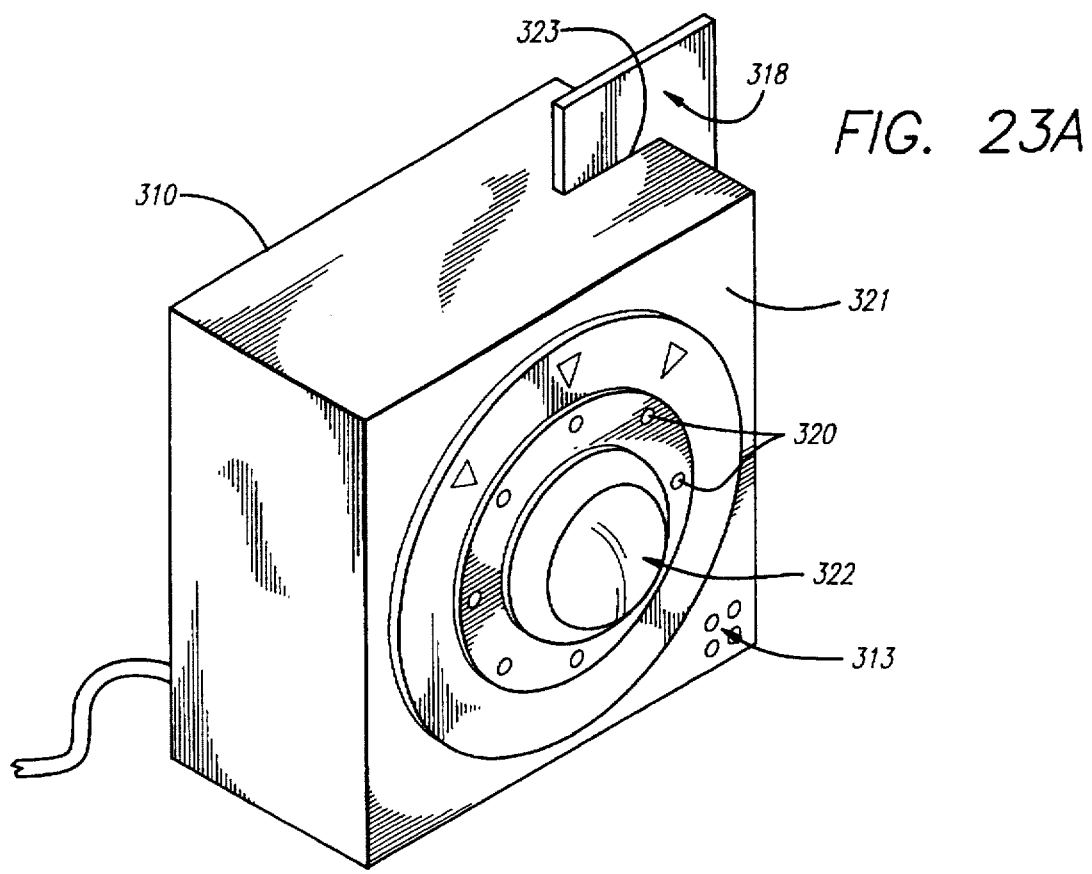
FIG. 23A is a perspective view of the controller.
Figure 23B:
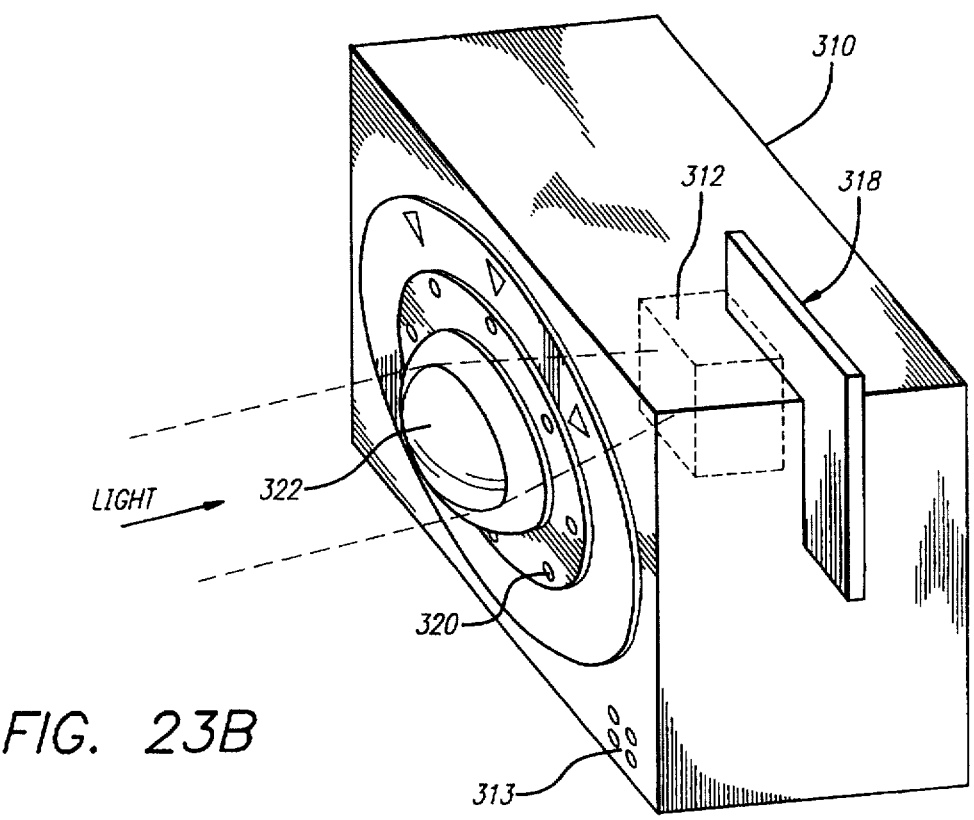
FIG. 23B is another perspective view of the controller.

As shown in FIGS. 23A and 23B, the controller 310 may have a ring of light emitting diodes (LEDs) 320 on its front face 321. The interface 319 provides signals of an appropriate level to drive the LEDs 320, as will be described in more detail below. The lens 322 for the CCD 312 is mounted centrally of the ring of LEDs 320. Alternatively, the lens 322 may be mounted generally in the ring formed by the LEDs 320. A slot 323 for the plug-in ROM cartridge 318 is also provided.

Figure 24:
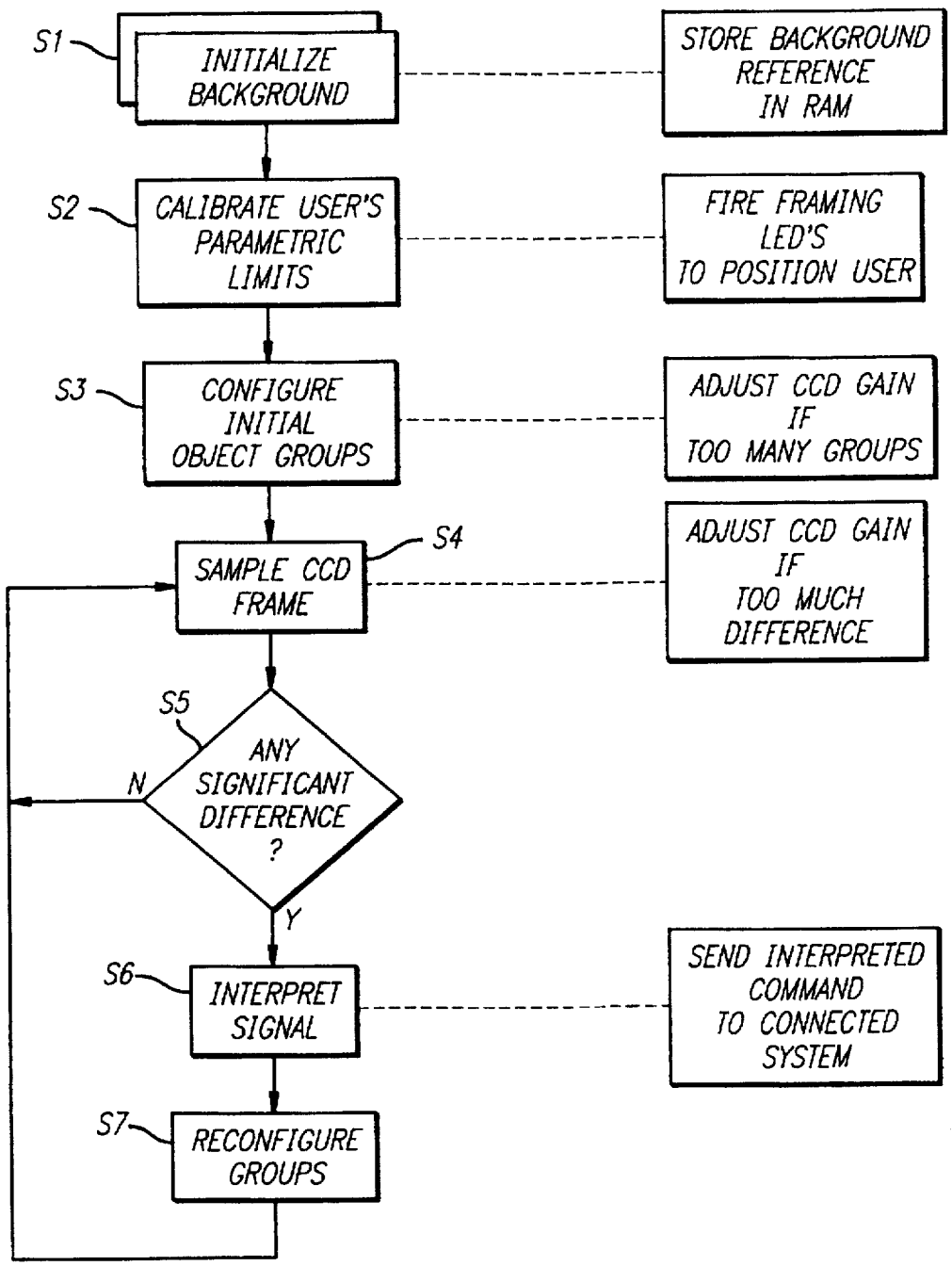
FIG. 24 is a flow diagram illustrating operation of the controller.

The operation of the controller 310 will now be described with particular reference to FIGS. 24 and 25. On start-up, or on demand from the user, the software running in the controller 310 enters an initialization mode. In step S1 in FIG. 24, the user's background is captured and stored as a reference in the RAM 317. In the subsequent step S2, the user's parametric limits are calibrated. During this step, the user may move through the range of motions that will be desired in using the software, for example to play a game. This step S2 allows the user to determine the extent of movement required to initiate a command from the controller 310. For example, the system can be set so that relatively large body or hand movements are required or, alternatively, so that only relatively small body or hand movements are required. The user can decide whether to be seated or standing.

Figure 25:
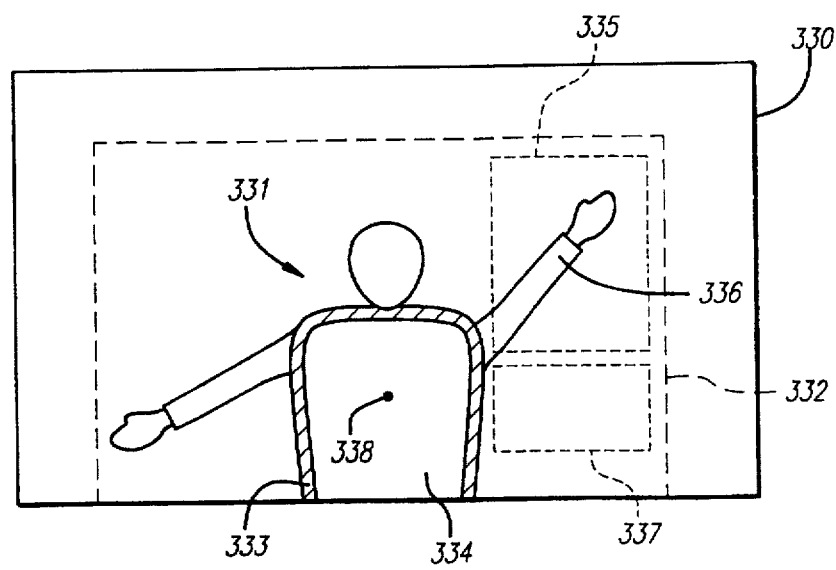
FIG. 25 is a schematic drawing showing the field of view of the controller.

With reference to FIG. 25, the field of view 330 of the CCD 312 is indicated. A user 331 is shown generally centrally of the field of view 330. The envelope of the user's motion is indicated by a dashed line 332. It will be seen that the envelope 332 of the user's motion is spaced from the sides and top of the field of view 330 of the CCD 312 in order to allow for some movement of the user 331 from the center of the field of view 330. In addition, a buffer zone 333 is determined around the torso 334 of the user 331. This buffer zone 333 is not used for decoding the desired commands from the user 331 and thus allows some minor movement of the user to the left, right, up or down without those minor movements being interpreted as desired commands.

As mentioned, during the step S2, the basic position and movements of the user 331 are calibrated. In particular, various command regions are determined. If the user moves into a command region, or moves a hand up and down in a command region for example, the software will analyze that movement to determine the desired output signal. One example of a command region is indicated by a dotted box 335 around the user's left arm 336 in FIG. 25 so that movement of the user's left arm 336, in the command region 335 for that arm 336, will be detected by the software. In general, the command regions can be specified anywhere in the field of view 330 outside the buffer zone 333 around the user's torso 334.

If it is determined in the step S2 that the envelope of user's motion 332 has moved outside the field of view 330 of the CCD 312, the CPU 311 causes appropriate signals to be output to the framing LEDs 320 on the controller 310. For example, if the user 331 has moved too far to the left, the LEDs 320 to the right of the user may be caused to flash to indicate that the user should move to the right. Similarly, the LEDs 320 to the top, bottom or left can be flashed to prompt the user to move in the appropriate direction. If the user is too close to or too far away from the CCD 312, an appropriate combination of flashing LEDs 320 can be used to indicate that the user should move further away from or nearer to the CCD 312 as necessary.

In the step S3, the precise object groups or command regions for the user motion are configured and stored. One example of a command region 335 around the user's left arm 336 has already been discussed. Any reasonable motion of the user's arms in any particular region within the field of view 330 can be set along with the associated output command from the controller 310. For example, movement of the user's left arm 336 in the command region 335 may cause a character in a game to move to the left. A "special" move for a particular game, such as causing a character to spin about its own axis, can be controlled by defining a further command region 337 for the user's left arm 336 below the first command region 335 for example, as indicated by a dot and dashed line 337. Movement of the user's left arm 336 into the second command region 337 will produce the necessary output from the controller 310 to cause the character to execute the "special" move. As another example, the user could hold both arms out horizontally to the sides to indicate that a "flying" motion is required or the character.

In the step S3, if too many command regions or object groups have been defined, the gain of the CCD 312 can be adjusted so as to enhance or reduce the contrast between the user and the environment. In other words, the sensitivity of the system can be adjusted. Also, the gain of the CCD 312 can be initially set according to the background lighting in order to provide the maximum contrast between the user 331 and the user's background for the software.

Once the initializing steps S1 to S3 have been completed, the software proceeds to step S4 for dynamic control of the outputs from the controller 310. In particular, in the step S4, the field of view 330 of the CCD 312 is sampled and compared with the previously sampled frame. If there is too much difference between the two frames, for example because the background lighting has changed dramatically, the gain of the CCD 312 can be adjusted as indicated in FIG. 24.

In the step S5, it is determined whether or not there are any differences between the first sampled frame and the second sampled frame by comparing corresponding pixels in a command region. If there are no significant differences, control returns to the step S4. If there are significant differences, control proceeds to the step S6.

In the step S6, the motion of the user in a particular command region or object group is interpreted in order to cause the CPU 311 to output an appropriate command signal to the game signal or computer 301 to which the controller 310 is connected.

Control then proceeds to the step S7 in which the command regions or object groups are reconfigured so that wholesale movement of the user 331 can be accommodated. In particular, the position of the centroid 338 of the user's torso 334 is determined. If the user 331 moves up as determined by movement of the centroid 338, the position of each of the defined command regions or object groups (for example the command regions 335, 337 in FIG. 25) can similarly be indexed upwards to accommodate such movement of the user. Control then returns to the step S4 for sampling of the next frame.

In the step S6, as the time interval between the sampled frames will be known, and correspondingly the amount of possible movement by a user in that time can be determined, suspiciously large movements (for example caused by other persons appearing in the background) can be ignored or an interpolated value used instead. Also, if at any time the envelope of user's motion 332 moves outside the field of view 330 of the CCD 312, the game or other software running on the game system or computer 301 can be caused to pause so that the user can be prompted by the use of the LEDs 320 to move centrally of the field of view 330 again.

It will be appreciated that many different movements of the user 331 can be stored during the initialization steps. Movement of the hands and arms could be separately stored. In addition, if the user 331 crouches down, this can correspondingly cause a character on screen to crouch down. Accordingly, more intuitive movements can be used by the user to control the game system or computer 301 without necessarily requiring the user to remember a series of special (and often complex) key combinations in order to produce the desired effect in the software running on the game system or computer 301.

The controller 310 can be used to obtain proportional control of a game. For example, the system can be set so that the faster the user moves an arm, the faster the character will move in the appropriate direction. As another example, the direction of movement can be proportionally controlled and movement is not restricted to the usual north, south, east, west, north-east, south-east, south-west, and north-west directions commonly found in many games.

The ROM cartridge 318 may contain game or other application-specific information so that it can compare received audio and/or visual information from the microphone 313, lens 322 and CCD 312 with the stored information to determine what control commands should be sent to the computer being controlled by the controller 310.

The decision making processes in the computer 310 can be reasonably sophisticated. For example, motion prediction may be used by analyzing the speed and direction of movement of a user, or elements of a user and knowing the interrelation between the elements. The software could be such as to allow the controller 310 to "understand" what human motion is possible or desirable so that the controller might be used in connection with training a person to use a computer, for exercise, rehabilitation, or therapy, for example.

What is claimed is:

1. A command system for monitoring movement of a subject and for controlling in accordance with movement of the subject a graphical user interface, the command system comprising:

a) an optical detector unit having an aperture through which light from a field of view is receivable, and an output for frame data indicative of the light received from the field of view the subject being positionable in the field of view, the frame data defining a subject frame, the output providing the frame data on a subject frame-by-subject frame basis; and b) a command unit having an input in communication with the output of the optical detector unit for receiving the frame data on the subject frame-by-subject frame basis, and an output for providing a command signal to control the graphic user interface the command unit including processing circuitry in communication with the input and the output of the command unit for:

(1) determining position of the subject in a previous subject frame from the frame data of the previous subject frame, and position of the subject in a present subject frame from the frame data of the present subject frame;

(2) calculating velocity of the subject based upon the position of the subject in the previous subject frame and upon the position of the subject in the present subject frame, the velocity being a vector having a magnitude and a direction;

(3) generating a command signal based upon the velocity of the subject;

(4) determining whether the subject is positioned in a proper position within the field of view, the proper position being defined as a position where the subject is substantially centered within the field of view;

(5) determining which direction the subject needs to move to be in the proper position in the field of view; and (6) generating a positioning signal based upon the direction the subject needs to move to be in the proper position, with the output of the command unit providing the positioning signal; and c) a subject positioning unit having a input in communication with the output of the command unit for receiving the positioning signal, and a subject interface including an array of light-emitting diodes (LEDs) configured such that when the LEDs illuminate based upon the positioning signal, the LEDs indicate to the subject which direction the subject needs to move to be in the proper position.

2. The command system of claim 1 wherein the array of LEDs includes an up LED, a down LED, a left LED, and a right LED;

the subject interface illuminating the LED corresponding to the direction in which the subject needs to move to be in the proper position as indicated by the positioning signal.

3. A command system for monitoring movement of a subject and for controlling in accordance with movement of the subject a graphical user interface, the command system comprising:

an optical detector unit including an aperture through which from a field of view is receivable a charge-coupled device CCD having a plurality of pixels on which light received through the aperture is incident, and an output for frame data indicative of the light received from the field of view, the subject being positionable in the field of view, the frame data defining a subject frame, the output providing the frame data on a subject frame-by-subject frame basis, each of the pixels having a value indicative of the amount of light incident thereon, the value of the pixels changing from one subject frame to the next subject frame when the amount of light incident thereon changes, the frame data for a subject frame being comprised of the values of the pixels for the subject frame; and a command unit having an input in communication with the output of the optical detector unit for receiving the frame data on the subject frame-by-subject frame basis, and an output for providing a command signal to control the graphic user interface, the command unit including processing circuitry in communication with the input and the output of the command unit for:

determining position of the subject in a previous subject frame from the frame data of the previous subject frame, and position of the subject in a present subject frame from the frame data of the present subject frame;

calculating velocity of the subject based upon the position of the subject in the previous subject frame and upon the position of the subject in the present subject frame, the velocity being a vector having a magnitude and a direction; and generating a command signal based upon the velocity of the subject;

wherein the processing circuitry of the command unit further:

a) compares the value of each of the pixels of the present subject frame with the value of the corresponding pixel of the previous subject frame to obtain a difference value for each of the pixels;

b) assigns an ON difference bit to each of the pixels for which the difference value is greater than a predetermined threshold value;

c) determines an edge of the subject in the subject frame by locating at least two adjacent pixels to which an ON difference bit was assigned;

d) records the position of the adjacent pixels;

e) calculates the velocity of the subject based upon the position of the adjacent pixels in the previous subject frame and upon the position of the adjacent pixels in the present subject frame; and f) generates a command signal based upon the velocity of the subject.

4. The command system of claim 3 wherein:

a) the CCD of the optical detector unit provides the frame data on the subject frame-by-subject frame basis at a predetermined frequency, whereby there is a predetermined period of time between the previous subject frame and the present subject frame; and b) the processing circuitry of the command unit calculates velocity by:

(1) calculating distance between the position of the adjacent pixels in the previous subject frame and the position of the adjacent pixels in the present subject frame; and (2) dividing the distance by the predetermined period of time between the previous subject frame and the present subject frame.

5. The command system of claim 3 wherein the processing circuitry of the command unit:

a) defines a command vector extending from the position of the adjacent pixels in the previous subject frame to the position of the adjacent pixels in the present subject frame;

b) calculates a magnitude of the command vector; and c) generates a command signal based upon the magnitude of the command vector.

6. The command system of claim 5 wherein the processing circuitry of the command unit:

a) determines a horizontal direction vector and a vertical direction vector of the command vector;

b) calculates a magnitude of the horizontal direction vector and a magnitude of the vertical direction vector;

c) compares the magnitude of the horizontal direction vector with the magnitude of the vertical direction vector to determine which of the two direction vectors has the greater magnitude; and d) generates a command signal based upon the direction vector which has the greater magnitude.

7. The command system of claim 3 wherein the processing circuitry of the command unit:

a) determines whether the velocity of the subject is within a predetermined range;

b) generates a command signal based upon the velocity of the subject when the velocity of the subject is within the predetermined range.

8. The command system of claim 3 wherein the processing circuitry of the command unit:
 a) calculates a weighted average of the velocity of the subject in the subject frames previous to the present subject frame;
 b) adjusts the velocity of the subject in the present frame based upon the weighted average.

9. The command system of claim 3 wherein:
 a) the processing circuitry of the command unit includes comparison circuitry for comparing the value of each of the pixels of the present subject frame with the value of the corresponding pixel of the previous subject frame to obtain a difference value for each of the pixels; and
 b) the comparison circuitry of the command unit and the CCD of the optical detector unit are fabricated on a single chip.

10. A command system for monitoring movement of a subject and for controlling in accordance with movement of the subject a graphical user interface, the command system comprising:
 an optical detector unit including aperture through which from a field of view is receivable a charge-coupled device CCD having a plurality of pixels on which light received through the aperture is incident, and an output for providing frame data indicative of the light received from the field of view, the subject being positionable in the field of view, the frame data defining a subject frame, the output providing the frame data on a subject frame-by-subject frame basis, each of the pixels having a value indicative of the amount of light incident thereon, the value of the pixels changing from one subject frame to the next subject frame when the amount of light incident thereon changes, the frame data for a subject frame being comprised of the values of the pixels for the subject frame; and
 a command unit having an input in communication with the output of the optical detector unit for receiving the frame data on the subject frame-by-subject frame basis, and an output for providing a command signal to control the graphic user interface, the command unit including processing circuitry in communication with the input and the output of the command unit for:
  determining position of the subject in a previous subject frame from the frame data of the previous subject frame, and position of the subject in a present subject frame from the frame data of the present subject frame;
  calculating velocity of the subject based upon the position of the subject in the previous subject frame and upon the position of the subject in the present subject frame, the velocity being a vector having a magnitude and a direction; and
  generating a command signal based upon the velocity of the subject;
 wherein the processing circuitry of the command unit further:
  a) compares the value of each of the pixels of the present subject frame with the value of the corresponding pixel of the previous subject frame to obtain a difference value for each of the pixels;
  b) assigns a difference bit to each of the pixels, the difference bit being ON when the difference value is greater than a predetermined threshold value or OFF when the difference value is less than the predetermined threshold value;
  c) combines into bytes the difference bits from the pixels, each of the bytes containing the difference bits from eight adjacent pixels;
  d) determines whether the number of difference bits being ON in each of the bytes exceeds a predetermined number;
  e) assigns a flag to each of the bytes for which the number of difference bits being ON exceeds the predetermined number;
  f) determines an edge of the subject in the subject frame by locating at least two bytes to which a flag was assigned;
  g) records the position of the adjacent bytes;
  h) calculates the velocity of the subject based upon the position of the adjacent bytes in the previous subject frame and upon the position of the adjacent bytes in the present subject frame; and
  i) generates a command signal based upon the velocity of the subject.

11. A command system for monitoring movement of a subject and for controlling in accordance with movement of the subject a graphical user interface, the command system comprising:
 an optical detector unit including an aperture through which light from a field of view is receivable, a charge-coupled device (CCD) having a plurality of pixels on which light received through the aperture is incident, and an output for providing frame data indicative of the light received from the field of view, the subject being positionable in the field of view, the frame data defining a subject frame, the output providing the frame data on a subject frame-by-subject frame basis, each of the pixels having a value indicative of the amount of light incident thereon, the value of the pixels changing from one subject frame to the next subject frame when the amount of light incident thereon changes, the frame data for a subject frame being comprised of the values of the pixels for the subject frame, the CCD having a sensitivity to the amount of light incident on the pixels, the sensitivity being adjustable; and
 a command unit having an input in communication with the output of the optical detector unit for receiving the frame data on the subject frame-by-subject frame basis, and an output for providing a command signal to control the graphic user interface, the command unit including processing circuitry in communication with the input and the output of the command unit for:
  determining position of the subject in a previous subject frame from the frame data of the previous subject frame, and position of the subject in a present subject frame from the frame data of the present subject frame;
  calculating velocity of the subject based upon the position of the subject in the previous subject frame and upon the position of the subject in the present subject frame, the velocity being a vector having a magnitude and a direction; and
  generating a command signal based upon the velocity of the subject;
 wherein the processing circuitry of the command unit further:
  a) compares the value of each of the pixels of the present subject frame with the value of the corresponding pixel of the previous subject frame to obtain a difference value for each of the pixels;

b) assigns a difference bit to each of the pixels for which the difference value is greater than a predetermined threshold value;

c) counts the number of pixels to which a difference bit was assigned; and d) adjusts the sensitivity of the CCD when the number of pixels to which a difference bit was assigned exceeds a predetermined number.

12. A command system for monitoring movement of a subject and for controlling in accordance with movement of the subject a graphical user interface, the command system comprising:

an optical detector unit having an aperture through which light from a field of view is receivable, and an output for providing frame data indicative of the light received from the field of view, the subject being positionable in the field of view, the frame data defining a subject frame, the output providing the frame data on a subject frame-by-subject frame basis; and a command unit having an input in communication with the output of the optical detector unit for receiving the frame data on the subject frame-by-subject frame basis, and an output for providing a command signal to control the graphic user interface, the command unit including processing circuitry in communication with the input and the output of the command unit for:

determining position of the subject in a previous subject frame from the frame data of the previous subject frame, and position of the subject in a present subject frame from the frame data of the present subject frame;

calculating velocity of the subject based upon the position of the subject in the previous subject frame and upon the position of the subject in the present subject frame, the velocity being a vector having a magnitude and a direction; and generating a command signal based upon the velocity of the subject;

wherein the processing circuitry of the command unit further:

a) defines a plurality of sub-regions within the subject frame;

b) determines the position of the subject in each of the sub-regions of the previous subject frame from the frame data of the previous subject frame, and the position of the subject in each of the sub-regions of the present subject frame from the frame data of the present subject frame;

c) calculates velocity of the subject in each of the sub-regions based upon the position of the subject in each of the sub-regions of the previous subject frame, and upon the position of the subject in the sub-regions of the present subject frame corresponding to each of the sub-regions of the previous subject frame; and d) generates a command signal based upon the velocity of the subject in each of the sub-regions, the number of command signals generated being up to the number of sub-regions defined within the subject frame.

13. The command system of claim 12 wherein the processing circuitry of the command unit defines each of the sub-regions such that the velocity of the subject in each of the sub-regions results in a command signal for each of the sub-regions which is different from the command signals for the other sub-regions, each of the command signals controlling the graphical user interface differently.

14. The command system of claim 12 wherein the processing circuitry of the command unit defines an area within the subject frame in which the velocity of the subject is not calculated.

15. A method for providing a command signal indicative of movement of a subject comprising the steps of:

receiving light from a field of view in which a subject is positionable with an array of pixels, each of the pixels having a value indicative of the amount of light incident thereon;

generating sets of data from the values of the pixels, each of the sets of data being indicative of light received from the field of view at an instant of time different from the other sets of data;

calculating velocity of the subject from the sets of data, the velocity being a vector having a magnitude and a direction, with the steps of:

a) comparing the value of each of the pixels from a present set of data with the value of the corresponding pixel from a previous set of data to obtain a difference value for each of the pixels;

b) assigning an ON difference bit to each of the pixels for which the difference value is greater than a predetermined threshold value;

c) determining an edge of the subject in the field of view by locating at least two adjacent pixels to which an ON difference bit was assigned;

d) recording the position of the adjacent pixels; and e) calculating velocity of the subject based upon the position of the adjacent pixels from the previous set of data and upon the position of the pixels in the present set of data; and generating a command signal based on the velocity of the subject.

16. The method of claim 15 wherein said step of generating sets of data comprises the step of generating sets of data from the values of the pixels at a predetermined frequency, each of the sets of data being indicative of light received from the field of view at an instant of time different from the other sets of data and having a predetermined period of time between the set of data and a previous set of data;

wherein said step of calculating velocity comprises the steps of:

a) calculating distance between the position of the adjacent pixels from the previous set of data and the position of the adjacent pixels from the present set of data; and b) dividing the distance by the predetermined period of time.

17. The method of claim 15 wherein said step of calculating velocity comprises the step of:

a) defining a command vector extending from the position of the adjacent pixels from the previous set of data to the position of the adjacent pixels from the present set of data; and b) calculating a magnitude of the command vector;

wherein said step of generating a command signal comprises the step of generating a command signal based upon the magnitude of the command vector.

18. The method of claim 15 further comprising the step of determining whether the velocity of the subject is within a predetermined range by being greater than a minimum threshold and less than a maximum threshold;

wherein said step of generating a command signal comprises the step of generating a command signal based upon the velocity of the subject when the velocity of the subject is within the predetermined range.

19. The method of claim 15 further comprising the steps of:
   a) calculating a weighted average of the velocity of the subject from the previous sets of data; and
   b) adjusting the velocity of the subject based upon the weighted average.

20. A method for providing a command signal indicative of movement of a subject comprising the steps of:
   receiving light from a field of view in which a subject is positionable with an array of pixels, each of the pixels having a value indicative of the amount of light incident thereon;
   generating sets of data from the values of the pixels, each of the sets of data being indicative of light received from the field of view at an instant of time different from the other sets of data;
   calculating velocity of the subject from the sets of data, the velocity being a vector having a magnitude and a direction, with the steps of:
   a) comparing the value of each of the pixels from a present set of data with the value of the corresponding pixel from a previous set of data to obtain a difference value for each of the pixels;
   b) assigning an ON difference bit to each of the pixels, the difference bit being ON when the difference value is greater than a predetermined threshold value or OFF when the difference value is less than the predetermined threshold value;
   c) combining into difference bytes the difference bits of the pixels, each of the difference bytes containing the difference bits from eight adjacent pixels;
   d) determining whether the number of difference bits being ON in each of the difference bytes exceeds a predetermined number;
   e) assigning a flag to each of the difference bytes for which the number of difference bits being ON exceeds the predetermined number;
   f) determining an edge of the subject in the field of view by locating at least two difference bytes to which a flag was assigned; and
   g) recording the position of the adjacent difference bytes;
   wherein said step of calculating velocity comprises the step of calculating velocity of the subject based upon the position of the adjacent difference bytes from the previous set of data and upon the position of the adjacent difference bytes from the present set of data; and
   generating a command signal based on the velocity of the subject.

21. A method for providing a command signal indicative of movement of a subject comprising the steps of:
   receiving light from a field of view in which a subject is positionable with a charge-coupled device (CCD) having an array of pixels, each of the pixels having a value indicative of the amount of light incident thereon, the CCD having an adjustable sensitivity; and
   adjusting the sensitivity of the CCD with the steps of:
   a) comparing the value of each of the pixels from a present set of data with the value of the corresponding pixels from a previous set of data to obtain a difference value for each of the pixels;
   b) assigning a difference bit to each of the pixels for which the difference value is greater than a predetermined threshold value;
   c) counting the number of pixels to which a difference bit was assigned; and
   d) adjusting the sensitivity of the CCD when the number of pixels to which a difference bit was assigned exceeds a predetermined number;
   generating sets of data from the values of the pixels, each of the sets of data being indicative of light received from the field of view at an instant of time different from the other sets of data;
   calculating velocity of the subject from the sets of data, the velocity being a vector having a magnitude and a direction; and
   generating a command signal based on the velocity of the subject.

22. A method for providing a command signal indicative of movement of a subject comprising the steps of:
   receiving light from a field of view in which a subject is positionable;
   generating sets of data from the received light, each of the sets of data being indicative of the amount of light received from the field of view at an instant of time different from the other sets of data and defining a subject frame for that instant of time;
   defining a plurality of sub-regions within the subject frames;
   determining a previous position of the subject in each of the sub-regions of the subject frame from a previous set of data and a present position of the subject in each of the sub-regions of the subject frame from a present set of data;
   calculating velocity of the subject in each of the sub-regions based upon the previous position of the subject and the present position of the subject, the velocity being a vector having a magnitude and a direction; and
   generating a command signal based upon the velocity of the subject in each of the sub-regions, the number of command signals being up to the number of sub-regions defined within the subject frame, each of the command signals being different from the other command signals.

23. The method of claim 22 further comprising the step of defining an area within the subject frame in which the subject is positionable and in which the velocity of the subject is not calculated.

24. A method for controlling a character displayed on a video display unit comprising the steps of:
   a) positioning a subject within a field of view of an optical detector unit;
   b) defining a plurality of sub-regions around the subject within the field of view;
   c) detecting movement of the subject within the sub-regions;
   d) generating a command signal based on the detected movement; and
   e) animating the character based upon the command signal.

25. The method of claim 24:
   wherein the detected movement of the subject has a velocity with a magnitude and a direction; and
   further comprising the steps of:
   a) calculating the magnitude of the velocity of the detected movement of the subject; and
   b) calculating the direction of the velocity of the detected movement of the subject;

wherein said step of generating a command signal comprises the step of generating a command signal based upon the magnitude and the direction of the velocity of the detected movement of the subject.

26. The method of claim 21 further comprising the step of positioning the subject in the field of view when the subject is not substantially centrally positioned in the field of view.

27. A command system for monitoring movement of a subject and for controlling in accordance with movement of the subject a graphical user interface, the command system comprising:

a) an optical detector unit having an aperture through which light from a field of view is receivable, and an output for providing frame data indicative of the light received from the field of view, the subject being positionable in the field of view, the frame data defining a subject frame, the output providing the frame data on a subject frame-by-subject frame basis; and b) a command unit having an input in communication with the output of the optical detector unit for receiving the frame data on the subject frame-by-subject frame basis, and an output for providing a command signal to control the graphic user interface, the command unit including processing circuitry in communication with the input and the output of the command unit for:

(1) determining position of the subject in a previous subject frame from the frame data of the previous subject frame, and position of the subject in a present subject frame from the frame data of the present subject frame;

(2) calculating velocity of the subject as a vector having a magnitude and a direction, the velocity being determined based upon the position of the subject in the previous subject frame and upon the position of the subject in the present subject frame, the direction of the velocity having a horizontal component and a vertical component;

(3) calculating the magnitude of the horizontal component and the magnitude of the vertical component of the velocity of the subject;

(4) comparing the magnitude of the velocity of the horizontal component with the magnitude of the velocity of the vertical component to determine which of the two magnitudes of velocity is greater; and (5) generating a command signal based upon the greater of the two magnitudes of velocity.

28. A method for providing a command signal indicative of movement of a subject comprising the steps of:

a) receiving light from a field of view in which a subject is positionable;

b) generating sets of data from the received light, each of the sets of data being indicative of light received from the field of view at an instant of time different from the other sets of data;

c) determining a previous position of the subject in the field of view from a previous set of data;

d) determining a present position of the subject in the field of view from a present set of data;

e) determining velocity of the subject from the previous position of the subject and the present position of the subject, the velocity being a vector having a magnitude and a direction with a horizontal component and a vertical component;

f) calculating the magnitude of the velocity of the horizontal component and the magnitude of the velocity of the vertical component of the subject based upon the previous position and the present position of the subject;

g) comparing the magnitude of the velocity of the horizontal component with the magnitude of the velocity of the vertical component to determine which of the two magnitudes of velocity is greater; and f) generating a command signal based upon the greater of the two magnitudes of velocity.

* * * * *